US011307142B2

(12) United States Patent
Miller et al.

(10) Patent No.: US 11,307,142 B2
(45) Date of Patent: Apr. 19, 2022

(54) MULTISPECTRAL SAMPLE IMAGING

(71) Applicant: Akoya Biosciences, Inc., Menlo Park, CA (US)

(72) Inventors: Peter J. Miller, Hopkinton, MA (US); Kent S. Johnson, Cambridge, MA (US); Carla Coltharp, Waltham, MA (US)

(73) Assignee: Akoya Biosciences, Inc., Menlo Park, CA (US)

( * ) Notice: Subject to any disclaimer, the term of this patent is extended or adjusted under 35 U.S.C. 154(b) by 0 days.

(21) Appl. No.: 16/403,401

(22) Filed: May 3, 2019

(65) Prior Publication Data

US 2019/0339203 A1    Nov. 7, 2019

Related U.S. Application Data

(60) Provisional application No. 62/666,697, filed on May 3, 2018.

(51) Int. Cl.
*G01N 21/64*        (2006.01)
*G06T 7/194*        (2017.01)
(Continued)

(52) U.S. Cl.
CPC ............ *G01N 21/6458* (2013.01); *G01J 3/28* (2013.01); *G01J 3/2823* (2013.01);
(Continued)

(58) Field of Classification Search
CPC ........... G01N 21/6458; G01N 21/6456; G01N 2021/6421; G01N 2021/6419; G01N 21/6428; G01N 2021/6417; G01N 21/6486; G06T 7/194; G06T 7/0012; G06T 2207/10036; G06T 2207/10056;
(Continued)

(56) References Cited

U.S. PATENT DOCUMENTS 9,612,245 B2 *  4/2017  Rich .................... G01N 33/582
10,194,854 B2 * 2/2019  Keating ................. A61B 5/201
(Continued)

OTHER PUBLICATIONS

The International Search Report and Written Opinion of the International Searching Authority for International Application No. PCT/US2019/030735 dated Jul. 29, 2019.
(Continued)

*Primary Examiner* — Kiho Kim
(74) *Attorney, Agent, or Firm* — Fish & Richardson P.C.

(57) ABSTRACT

The disclosure features methods that include exposing a biological sample to illumination light and measuring light emission from the sample to obtain N sample images, where each sample image corresponds to a different combination of a wavelength band of the illumination light and one or more wavelength bands of the light emission, where the one or more wavelength bands of the light emission define a wavelength range, and where N>1, and exposing the sample to illumination light in a background excitation band and measuring light emission from the sample in a background spectral band to obtain a background image of the sample, where the background spectral band corresponds to a wavelength within the wavelength range.

22 Claims, 18 Drawing Sheets

(51) Int. Cl.
*G06T 7/00* (2017.01)
*G01J 3/28* (2006.01)

(52) U.S. Cl.
CPC ....... *G01N 21/6428* (2013.01); *G06T 7/0012* (2013.01); *G06T 7/194* (2017.01); *G01J 2003/2826* (2013.01); *G01N 2021/6419* (2013.01); *G01N 2021/6421* (2013.01); *G06T 2207/10036* (2013.01); *G06T 2207/10056* (2013.01); *G06T 2207/10064* (2013.01); *G06T 2207/30024* (2013.01)

(58) Field of Classification Search
CPC . G06T 2207/10064; G06T 2207/30024; G01J 3/0297; G01J 3/4406; G01J 3/28; G01J 2003/2826; G01J 3/2823
See application file for complete search history.

(56) References Cited

U.S. PATENT DOCUMENTS

| | | | |
|---|---|---|---|
| 10,281,451 B2* | 5/2019 | Mycek | G01N 33/5005 |
| 10,598,596 B1* | 3/2020 | Hug | G01N 21/64 |
| 2011/0182490 A1* | 7/2011 | Hoyt | G06T 7/11 |
| | | | 382/128 |
| 2014/0193061 A1 | 7/2014 | Miller et al. | |
| 2014/0349381 A1* | 11/2014 | Battrell | G01N 21/6452 |
| | | | 435/287.2 |
| 2016/0011116 A1 | 1/2016 | Miller et al. | |
| 2016/0110870 A1 | 4/2016 | Moriyama et al. | |
| 2017/0247745 A1* | 8/2017 | Shultz | B01L 7/52 |
| 2017/0299610 A1* | 10/2017 | Lakadamyali | C07K 16/18 |
| 2018/0024064 A1* | 1/2018 | Ho | G06T 7/0012 |
| | | | 250/459.1 |

OTHER PUBLICATIONS

Mansfield et al., "Autofluorescence removal, multiplexing, and automated analysis methods for in-vivo fluorescence imaging", *Journal of Biomedical Optics*, vol. 10, No. 4, pp. 041207-1-041207-9 (Jul./Aug. 2005).

Psycharakis et al., "Autofluorescence removal from fluorescence tomography data using multispectral imaging", *Proceedings of SPIE*, vol. 6626, pp. 662601-1-662601-7 (Jul. 5, 2007).

* cited by examiner

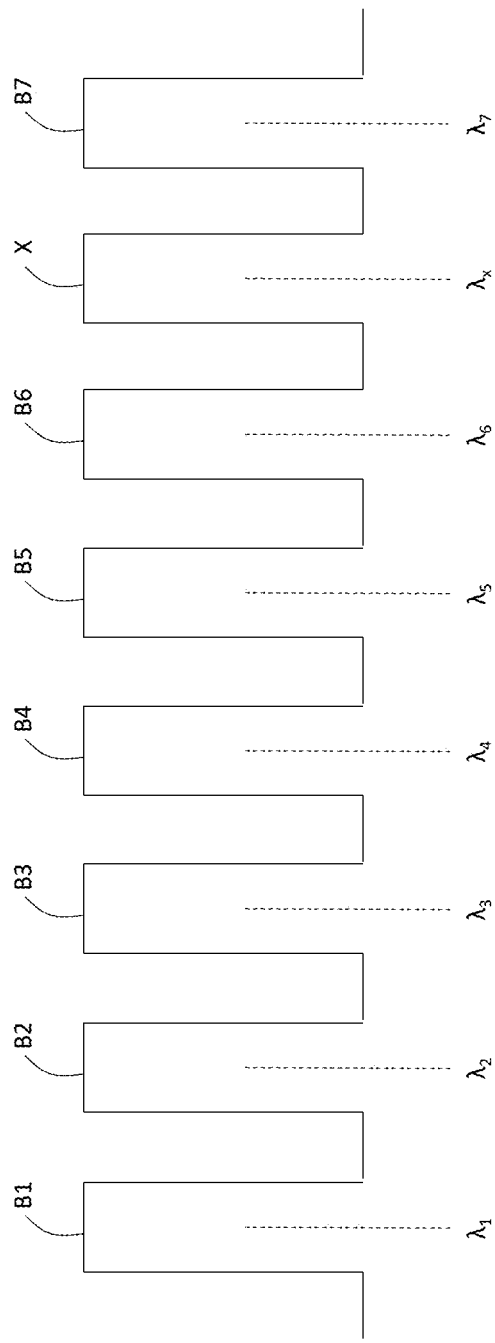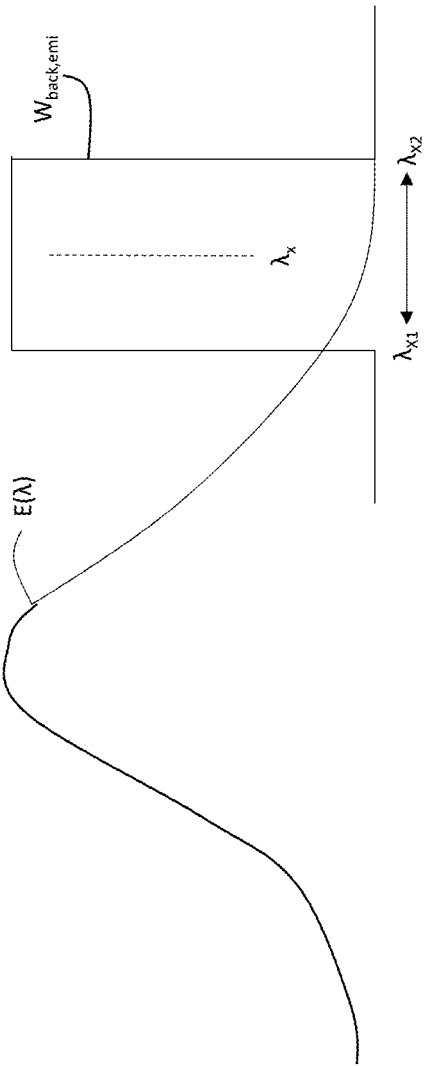

MULTISPECTRAL SAMPLE IMAGING

CROSS-REFERENCE TO RELATED APPLICATIONS

This application claims priority to U.S. Provisional Patent Application No. 62/666,697, filed on May 3, 2018, the entire contents of which are incorporated herein by reference.

TECHNICAL FIELD

This disclosure relates to multispectral imaging of biological samples, in particular by fluorescence microscopy.

BACKGROUND

Fluorescence microscopy techniques are used in pathology to provide information about disease and patient response, to advance human understanding in research settings, and to guide individual patient treatment in clinical settings, Most fluorescent microscopy makes use of dyes that are engineered or selected to provide a strong fluorescence signal with known excitation and emission properties. Immuno-fluorescence labeling techniques allow individual epitopes in a sample to be targeted with specificity, so that proteins, antibodies, nucleic acids, and other tissue and cellular components can be examined even when present in relatively small quantities.

SUMMARY

In multispectral imaging, multiple dyes or stains are applied to a sample, and then the sample is imaged over a broad range of wavelengths, yielding a combined set of spatial and spectral measurements. The dyes or stains can be applied to the sample such that each stain binds specifically to a sample component of interest. Contributions of each of the sample components are separated by analyzing the set of spatial and spectral measurements to determine the quantity and spatial distribution of each of the components of interest within the sample. Certain fluorescent dyes have relatively well-defined excitation bands and emission bands. Accordingly, for some samples, it may be possible to choose several dyes—typically 3 or 4—having emission bands that are distinct enough so that they can be detected via spectral filtering without excessive cross-talk among the emission bands.

Tissue samples exhibit some degree of endogenous fluorescence response, which is termed autofluorescence. Autofluorescence may be stronger in formalin-fixed paraffin-embedded (FFPE) samples than in fresh-frozen samples, perhaps as a consequence of the fixation chemicals or the fixation process. Unlike engineered dyes, autofluorescence is a natural phenomenon and does not have well-defined excitation and emission bands. To the contrary, autofluorescence has a broad emission spanning much of the visible range, making its emission hard to distinguish from the fluorescence emission due to dyes that are specifically bound to components of interest in the sample.

This disclosure features methods and systems for measuring autofluorescence in samples to which one or more dyes or stains have been applied. In general, for a sample to which multiple dyes or stains have been applied, fluorescence emission is measured in a number of spectral wavelength bands, each of which may correspond to fluorescence emission largely from only a single one of the dyes or stains. Fluorescence emission is also measured in an emission band that does not correspond to significant emission from any of the applied dyes or stains. Emission in this band largely corresponds to autofluorescence from the sample. Based on information derived from measurement of fluorescence emission in this band, autofluorescence throughout the sample can be quantified. The quantified autofluorescence can then be used to correct fluorescence emission measurements for some or all of the dyes or stains, and further used to quantitatively measure some or all of the dyes or stains at different locations within the sample.

In one aspect, the disclosure features methods that include: exposing a biological sample to illumination light and measuring light emission from the sample to obtain N sample images, where each sample image corresponds to a different combination of a wavelength band of the illumination light and one or more wavelength bands of the light emission, where the one or more wavelength bands of the light emission define a wavelength range, and where $N>1$; and exposing the sample to illumination light in a background excitation band and measuring light emission from the sample in a background spectral band to obtain a background image of the sample, where the background spectral band corresponds to a wavelength within the wavelength range, and where for each of one or more non-endogenous spectral contributors in the sample exposed to the illumination light in the background excitation band, a spectral emission intensity at each wavelength within the background spectral band is 10% or less of a maximum measured spectral emission intensity of the non-endogenous spectral contributor following excitation of the sample in each of the wavelength bands of the illumination light and the background excitation band.

Embodiments of the methods can include any one or more of the following features.

The methods can include obtaining an autofluorescence image of the sample from the background image. For each of one or more non-endogenous spectral contributors in the sample exposed to the illumination light in the background excitation band, the spectral emission intensity at each wavelength within the background spectral band can be 4% or less (e.g., 2% or less) of the maximum measured spectral emission intensity of the non-endogenous spectral contributor following excitation of the sample in each of the wavelength bands of the illumination light and the background excitation band. The background spectral band can include a distribution of wavelengths having a full width at half maximum (FWHM) spectral width $\Delta\lambda$, and a center wavelength $\lambda_c$, and the wavelengths within the background spectral band can correspond to wavelengths within a range from $\lambda_c-\Delta\lambda/2$ to $\lambda_c+\Delta\lambda/2$.

N can be greater than 3 (e.g., greater than 5). The sample can include M non-endogenous spectral contributors, where $M \leq N$. M can be greater than 4 (e.g., greater than 6). The methods can include displaying the autofluorescence image on a display device.

The methods can include determining, at each of multiple locations in the sample, an amount of autofluorescence emission from the sample. The methods can include, at each of the multiple locations in the sample, and for one or more of the N sample images, adjusting values corresponding to sample emission intensity to correct for autofluorescence emission from the sample based on the amount of autofluorescence emission at each of the multiple locations and at least one pure spectrum of autofluorescence emission from the sample. The at least one pure spectrum of autofluorescence emission can include multiple pure spectra of autofluorescence emission, and the multiple pure spectra of autofluorescence emission can each correspond to a different subset of the multiple locations. The methods can include decomposing at least some of the N sample images based on the amount of autofluorescence emission from the sample at each of the multiple locations to obtain M spectral contributor images, where each of the M spectral contributor images corresponds to light emission only from a different one of the non-endogenous spectral contributors, and at each of the multiple locations, determining an amount of the M non-endogenous spectral contributors in the sample.

The methods can include decomposing the at least some of the N sample images based on at least one pure spectrum of autofluorescence emission from the sample. The at least one pure spectrum of autofluorescence emission can include multiple pure spectra of autofluorescence emission, and the multiple pure spectra of autofluorescence emission can each correspond to a different subset of the multiple locations.

A sum of spectral emission intensities of each non-endogenous spectral contributor in the sample at each wavelength within the background spectral band can be 10% or less of a total fluorescence emission intensity in the background spectral band.

The methods can include classifying pixels of one or more of the sample images into different classes based on information derived from the autofluorescence image. The different classes can correspond to different cell types in the sample.

The M non-endogenous spectral contributors can include one or more fluorescent species that selectively bind to different chemical moieties in the sample. The one or more fluorescent species can include one or more immunofluorescent probes. The M non-endogenous spectral contributors can include one or more counterstains.

Embodiments of the methods can also include any of the other features described herein, including any combinations of features individually described in connection with different embodiments, unless expressly stated otherwise.

In another aspect, the disclosure features computer readable storage media that include instructions that, when executed by a processing device, cause the processing device to: decompose a plurality of sample images of a biological sample using autofluorescence information for the sample to obtain one or more non-endogenous spectral contributor images of the sample; determine an amount of one or more non-endogenous spectral contributors at multiple locations in the sample based on the one or more non-endogenous spectral contributor images; and generate an output display that includes at least one of the non-endogenous spectral contributor images on a display device connected to the processing device, where each sample image corresponds to a different combination of a wavelength band of illumination light used to illuminate the sample and one or more wavelength bands of emission light from the sample, the one or more wavelength bands of emission light defining a wavelength range, where the background image corresponds to illumination of the sample with light in a background excitation band and measurement of light emission from the sample in a background spectral band, and where for each of the one or more non-endogenous spectral contributors in the sample illuminated with light in the background excitation band, a spectral emission intensity at each wavelength within the background spectral band is 10% or less of a maximum measured spectral emission intensity of the non-endogenous spectral contributor following excitation of the sample in each wavelength band of the illumination light and the background excitation band.

Embodiments of the storage media can include any one or more of the following features. The storage media can include instructions that, when executed by the processing device, cause the processing device to obtain the autofluorescence information for the sample from a background image of the sample. Each non-endogenous spectral contributor image can correspond only to light emission from a different one of the non-endogenous spectral contributors in the sample.

For each of the one or more non-endogenous spectral contributors in the sample illuminated with light in the background excitation band, the spectral emission intensity at each wavelength within the background spectral band can be 4% or less (e.g., 2% or less) of the maximum measured spectral emission intensity of the non-endogenous spectral contributor following excitation of the sample in each wavelength band of the illumination light and the background excitation band.

The sample can include M non-endogenous spectral contributors, where M≤N. M can be greater than 4 (e.g., greater than 6).

The autofluorescence information can include an amount of autofluorescence emission from the sample at each of the multiple locations in the sample. The storage media can include instructions that, when executed by the processing device, cause the processing device to decompose the plurality of sample images using the autofluorescence information and at least one pure spectrum of autofluorescence emission from the sample. The storage media can include instructions that, when executed by the processing device, cause the processing device to determine the at least one pure spectrum of autofluorescence from the background image.

The at least one pure spectrum of autofluorescence emission from the sample can include two or more different pure spectra of autofluorescence emission from the sample, and each of the different pure spectra can correspond to a different subset of the multiple spatial locations.

The storage media can include instructions that, when executed by the processing device, cause the processing device to adjust values corresponding to sample emission intensity in each of the sample images to correct for autofluorescence emission from the sample based on the amount of autofluorescence emission at each of the multiple locations and the at least one pure spectrum of autofluorescence emission from the sample.

A sum of spectral emission intensities of each non-endogenous spectral contributor in the sample at each wavelength within the background spectral band can be 10% or less of a total fluorescence emission intensity in the background spectral band.

The storage media can include instructions that, when executed by the processing device, cause the processing device to classify pixels of one or more of the sample images into different classes based on the autofluorescence information. The different classes can correspond to different cell types in the sample.

The M non-endogenous spectral contributors can include one or more fluorescent species that selectively bind to different chemical moieties in the sample. The M non-endogenous spectral contributors can include or more counterstains.

Embodiments of the storage media can also include any of the other features described herein, including any combinations of features described in connection with different embodiments, unless expressly stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description. Other features and advantages will be apparent from the description, drawings, and claims.

DESCRIPTION OF DRAWINGS

FIG. 3 is a schematic diagram showing an example set of spectral emission bands that can be used to measure fluorescence emission due to non-endogenous spectral contributors in a sample, and sample autofluorescence.

FIG. 4 is a schematic diagram showing fluorescence emission from a non-endogenous spectral contributor in a sample.

Like reference symbols in the various drawings indicate like elements.

DETAILED DESCRIPTION

Figure 1:
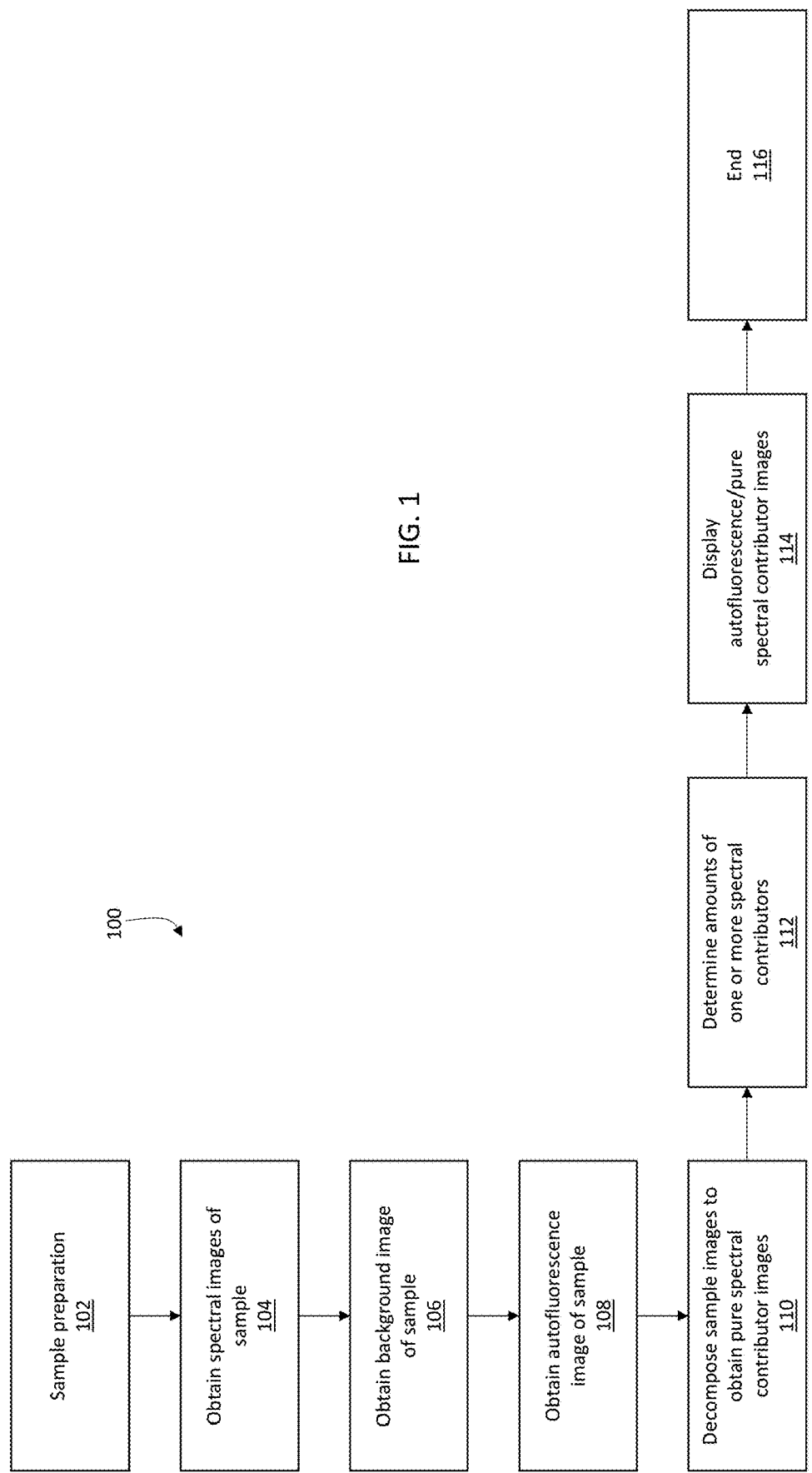
FIG. 1 is a flow chart showing example steps for measuring autofluorescence of a sample.

Various techniques have been developed in order to accurately measure immuno-fluorescence targets in the presence of autofluorescence. One approach involves multi spectral imaging, where sample images are obtained at different wavelengths to distinguish the contributions of dyes associated with immuno-fluorescent labeling from fluorescence emission due to sample autofluorescence. While these signals overlap spectrally, the spectral shape of each signal is different. A spectral unmixing or other spectral decomposition step is performed to separate contributions to the measured fluorescence signals into individual spectral components corresponding to the individual dyes, enabling measurement of multiple dyes despite the presence of spectrally broad autofluorescence emission. Spectral unmixing techniques can distinguish contributions from a number of dyes in a sample, even when the fluorescence emission from the dyes overlaps spectrally, providing a key multiplex sample labeling advantage.

Multiplexed immuno-fluorescence labeling refers to targeting multiple primary antibodies in one sample, and it can be achieved in various ways. Conceptually the simplest is direct labeling, where a primary antibody molecule is conjugated to a dye, with different dyes conjugated to different primary antibodies. This labeling process typically results in one dye molecule per target, so signal levels can be low unless the target itself is abundant. Indirect labeling provides a way to couple multiple dye molecules per target, enabling weaker targets to be studied. To avoid cross-labeling, different secondary antibody isotypes or species are generally used for each target, making the labeling process more complex.

Another approach to introducing multiple specific dyes is to conjugate a primary antibody to a nucleotide sequence that is recognized by a complementary sequence conjugated to a dye polymer. This technique is not limited by the number of available secondary antibody species.

To increase the amount of each fluorescent dye that selectively binds to the sample, dyes can be selectively applied to the sample sequentially using tyramide signal amplification (TSA). In TSA, a single primary antibody is used together with a secondary antibody coupled to horseradish peroxidase to catalyze covalent binding of dye molecules to surrounding tissue through cinnamide or tyramide molecules. Because the dye molecules are covalently bound to the tissue, the primary and secondary antibodies can subsequently be removed and the process can be repeated with other primary antibodies and dye molecules, permitting higher concentrations of dye molecules to be introduced into the sample in a multiplexed, specific manner.

In some TSA-based staining protocols, further amplification can be achieved by covalently binding a small molecule ligand selectively to the sample tissue via cinnamide or tyramide molecules, followed by incubation of the sample with a ligand-binding protein that is conjugated to multiple dyes molecules. For example, biotin can be introduced as the ligand and streptavidin can be used as the ligand-binding protein, but other ligand-protein combinations can also be used. Because the dye molecules are not covalently bound to the tissue, incubation of the ligand-bound sample with the ligand-binding protein typically occurs at the end of the multiplex staining protocol.

Methods and systems have been developed for the purpose of performing multispectral imaging of whole slide samples. In particular, such methods and systems can generate mosaic images with diffraction-limited multispectral images with a multi-centimeter field of view in two dimensions across a sample. Such systems use multi-band filters and selectable light sources such as LEDs or lasers, multiple epi-filter sets, or combinations of the two. When multiple epi-filters are used, registration of the multispectral images is important, as it allows images corresponding to different portions of the sample to be combined to form a seamless mosaic. US Patent Application Publication No. US 2014/0193061 describes methods for using multiple filters, each of which images the sample at a common band such as a counterstain band (e.g., a DAPI counterstain band) as well as other bands, and for combining the images into a mosaic image of the sample by using images measured at the common band to register images corresponding to all of the sample imaging bands. In this manner, samples can be imaged in 10 or more distinct emission bands can be imaged and co-registered. The entire contents of US Patent Application Publication No. US 2014/0193061 are incorporated herein by reference.

The foregoing methods for performing multispectral sample imaging can determine contributions from sample autofluorescence during spectral unmixing. For example, using an estimate of a pure spectrum of sample autofluorescence, the spectral unmixing process can yield an autofluorescence abundance image that represents a spatial distribution of autofluorescence within the sample. The autofluorescence image can be viewed as a type of "remainder" image that accounts for sample fluorescence that is not attributable to dyes applied to the sample.

For certain samples, however, abundance measurements of autofluorescence that are derived purely from spectral unmixing may not be entirely accurate. In particular, such measurements are derived using an estimate of a pure autofluorescence spectrum which may not perfectly correspond to autofluorescence in a particular sample of interest, particularly when that sample also include multiple fluorescent dyes and is preserved according to a certain fixation protocol. Moreover, autofluorescence can vary in a sample among different sample regions—and in particular, among different structures within a sample, such as different types of cells, and different types of cellular features (e.g., stroma, cytoplasm, cell membranes, nuclei)—and this variation may not be adequately represented by a single estimate of a pure autofluorescence spectrum.

The methods and systems described herein allow autofluorescence in a sample to be measured directly, rather than simply extracted during a spectral unmixing process. By directly measuring autofluorescence, sample-specific autofluorescence responses can be properly measured and accounted for during analysis of multispectral images that represent one or more dyes applied to the sample to target specific antibodies, proteins, nucleic acids, and other sample structures and cellular components. In particular, measured fluorescence signals in spectral emission bands that correspond to the individual applied dyes can be corrected to account for sample autofluorescence prior to, or during, image analysis, providing for more accurate abundance measurements of each of the individual applied dyes. To permit these improvements, both the abundance and spatial distribution of sample autofluorescence at multiple locations within the sample is determined prior to spectral decomposition of the multispectral images corresponding to the individual applied dyes.

Sample imaging systems typically include one or more displays on which sample images that represent spectral contributions corresponding to individual applied dyes are displayed to pathologists or other physicians or technicians for purposes of diagnosing disease and other states within the samples. Dyes are typically selected to act as reporters for particular antibodies, proteins (e.g., trans-membrane proteins), nucleic acid fragments, and/or cellular structures of interest which may indicate the presence or absence of certain conditions, and may provide complex physiological information about cell migration, protein expression, regulatory networks, mutations, and other events in the sample. The methods and systems described herein permit more accurate spectral contributor images to be displayed, thereby significantly improving conventional sample imaging and display systems, which in turn improves diagnostic information rendered by such systems.

The autofluorescence image(s) that are measured according to the methods and systems described herein can be also be used for additional purposes. For example, a measured autofluorescence image can be analyzed using a trained pixel-based classifier to identify different types of cells or cellular structures in a sample, and to exclude regions of a sample that correspond to certain types of cells or cellular structures that are not of interest. For example, a trained classifier can be used to identify red blood cells in a sample, which may not be of interest, but which may emit fluorescence in spectral regions that correspond to one or more dyes that have been applied to the sample to target specific sample targets of interest. A trained classifier can also be used to identify other types of cells, including (but not limited to) different types of white blood cells such as lymphocytes, neutrophils, eosinophils, monocytes, and basophils; reticulocytes; and tumor cells.

Regions of the sample that are not of interest can be excluded from the subsequent analysis (e.g., spectral unmixing of sample images), thereby excluding regions from the sample that would otherwise represent false positive detection for one or more of the applied dyes, and therefore, the cellular component(s) targeted by those applied dyes. By excluding certain sample regions from analysis via classification operations performed on measured autofluorescence images, the methods and systems described herein permit more accurate spectral contributor images to be displayed, thereby further significantly improving conventional sample imaging and display systems, and in turn improving the quality and utility of diagnostic information rendered by such systems.

The methods and systems described herein enable relatively rapid, whole-slide, multispectral imaging of multiply stained samples, for accurate and quantitative analysis in applications that include immuno-oncology assays, cell signaling studies, and multiplexed immuno-fluorescence pathology experiments generally. The methods and systems can be applied to a wide variety of samples, including biological samples such as (but not limited to) formalin-fixed, paraffin-embedded (FFPE) samples that have been labeled using a variety of different methods.

FIG. 1 is a flow chart 100 showing a series of example steps for imaging a sample. In a first step 102, a sample is prepared for imaging by applying one or more non-endogenous dyes to the sample. As used herein, a "dye" is a non-endogenous substance that binds to structures/chemical moieties within a sample, and emits fluorescent light when exposed to illumination light. The term "dye" is used interchangeably with the term "stain"; for purposes of this disclosure, a "dye" and a "stain" correspond to the same substances.

In general, one or more dyes are applied to the sample in step 102. For example, the number of applied dyes can be two or more (e.g., three or more, four or more, five or more, six or more, seven or more, eight or more, nine or more, ten or more, 12 or more, 15 or more, 20 or more, or even more). Applied dyes can be bound to specific types of antibodies, proteins, nucleic acids, vesicles, lipids, or other substances within the sample. Applied dyes can also be bound to specific cell types (e.g., red blood cells, lymphocytes, T cells, B cells) within a sample. Further, applied dyes can be bound to specific cellular structures or compartments (e.g., stroma, cell membranes, cytoplasm, cell nuclei, mitochondria, golgi bodies) within a sample.

In some embodiments, the one or more dyes applied to the sample can include one or more counterstains that bind to multiple structures, regions, or components in sample cells. Examples of suitable counterstains include, but are not limited to, DAPI, DRAQ5, Hoechst 33258, Hoechst 33342, and Hoechst 34580.

In certain embodiments, one or more of the dyes that are applied to the sample have spectrally separated emission bands. By choosing dyes with this property, fluorescence emission from each dye can readily be isolated from emission due to the other dyes, and measured, using suitable emission filters, minimizing interference resulting from spectral emission cross-talk among the dyes. As an example, in some embodiments, dyes are selected such that for a given pair of dyes D1 and D2, each having an emission spectrum and a maximum emission intensity $D1_{max}$ and $D2_{max}$ at wavelengths $\lambda_{D1}$ and $\lambda_{D2}$ respectively within the dye's emission spectrum, the emission intensity of dye D1 at $\lambda_{D2}$ is less than 10% (e.g., less than 8%, less than 6%, less than 4%, less than 2%, less than 1%, less than 0.5%, less than 0.25%) of $D1_{max}$, and the emission intensity of dye D2 at $\lambda_{D1}$ is less than 10% (e.g., less than 8%, less than 6%, less than 4%, less than 2%, less than 1%, less than 0.5%, less than 0.25%) of $D2_{max}$. The dyes may be selected such that the above pairwise relationship holds among all members of a group of three or more dyes, four or more dyes, five or more dyes, six or more dyes, eight or more dyes, ten or more dyes, 12 or more dyes, 15 or more dyes, 20 or more dyes, or even more dyes.

As discussed above, a wide variety of different sample preparation protocols can be used in step 102. One example of a suitable preparation protocol is described below. However, it should be understood that many different protocols that apply many different dyes to samples can be used.

Samples can be prepared for multispectral imaging using the Opal® Multiplex immunohistochemical (IHC) reagents (available from Akoya Biosciences, Menlo Park, Calif.), which can be used to label a wide variety of molecular targets within a sample. FFPE tissue samples are prepared for staining with Opal® reagents by baking at 60° C. for one hour followed by three 10-minute washes in xylene to remove paraffin. Samples are then rehydrated via an ethanol gradient into deionized water and fixed using 10% neutral buffered formalin for 20 minutes, followed by a wash in deionized water.

The Opal® Multiplex IHC staining procedure begins with one round of antigen retrieval, which can be performed using either buffer AR6 (antigen retrieval pH 6) or AR9 (antigen retrieval pH 9) via microwave treatment. After antigen retrieval, each sample target is labeled sequentially in a cycle that includes five steps: blocking, primary antibody incubation, secondary antibody incubation, tyramide deposition, and antibody stripping.

Blocking is achieved by incubating the sample for 10 minutes in Opal® Antibody Diluent at room temperature. The primary antibody can be incubated at various times and temperatures depending on the target. For example, for a lung cancer sample, Table 1 lists an example of primary antibodies and dilution ratios for a variety of different sample targets.

TABLE 1

| Staining Order | Target | Primary Antibody Vendor, Catalog No., Clone, Species | Primary Antibody Dilution Factor | Tyramide Reagent and Vendor | Tyramide Dilution Factor |
|---|---|---|---|---|---|
| 1 | FoxP3 | Abcam (Cambridge, UK), ab20034, 236A/E7, a-Ms | 1:100 | Opal 570 (Akoya Biosciences, Menlo Park, CA) | 1:300 |
| 2 | PD-L1 | CST (Danvers MA), 13684, E1L3N, a-Rb | 1:300 | Opal 520 (Akoya Biosciences, Menlo Park, CA) | 1:150 |
| 3 | PD-1 | AbCam (Cambridge, UK), ab137132, EPR4877(2), a-Rb | 1:300 | Opal 690 (Akoya Biosciences, Menlo Park, CA) | 1:100 |
| 4 | CD68 | Dako (Santa Clara CA), M0876, PG-M1, a-Ms | 1:100 | Opal 620 (Akoya Biosciences, Menlo Park, CA) | 1:150 |
| 5 | CD8 | AbD Serotec (Oxford UK), MCA1817, 4B11, a-Ms | 1:300 | Dy430 (Dyomics, Jena Germany) | 1:450 |
| 6 | Pan-Cytokeratin | Novus (Littleton CO), NBP2-29429, AE1/AE2, a-Ms | 1:300 | TSA-biotin (Akoya Biosciences, Menlo Park, CA) | 1:50 |

Each of the antibodies can be incubated for approximately 30 minutes at room temperature. Following primary antibody incubation, secondary antibody incubation is performed using the Opal® Polymer HRP Ms+Rb solution (Akoya Biosciences, Menlo Park, Calif.) for 10 minutes at room temperature, followed by 3 rinses with a TBST buffer composed of 0.1 M TRIS-HCl, pH 7.5, 0.15 M NaCl and 0.05% Tween® 20 (Sigma-Aldrich, St. Louis Mo.). Tyramide deposition is performed at room temperature for 10 minutes followed by 3 rinses with TBST. A different tyramide reagent is paired with each primary antibody, according to the targets chosen and dyes selected to interrogate the chosen targets. A staining cycle is completed by antibody stripping via microwave treatment in AR6 or AR9. The foregoing 5-step cycle can be repeated for each target in the sample. In direct analogy with the above procedure, if ligand-based tyramide reagents are used in the sample preparation procedure, incubation with the dye-conjugated ligand-binding proteins occurs after the final antibody stripping step.

After each of the dyes corresponding to particular targets within the sample have been applied, one or more counterstains can optionally be applied to the sample by incubating the sample with the counterstain. For example, to apply DAPI counterstain to a sample, the sample can be incubated in a DAPI solution (4 drops/mL) for 5 minutes at room temperature, followed by one wash in deionized water and one wash in TBST.

A stained sample—to which one or more dyes associated with specific sample targets and optionally, one or more counterstains, have been applied—can be further prepared for imaging by applying a mounting medium (for example, ProLong® Diamond, available from ThermoFisher Scientific, Waltham Mass.) and a coverslip.

In some embodiments, sample preparation can also include preparation of unstained samples that can be used to perform autofluorescence measurements. In general, unstained samples can be prepared by following a procedure that is analogous to the procedure for preparing stained samples, and simply omitting incubation steps that include fluorescent dyes. In the example described above, incubation steps with the various dyes shown in the fifth column of Table 1 are omitted, but the steps are otherwise the same. Such preparation protocols yield an unstained sample that has been processed with the same temperature changes, antibody additions, and pH changes that stained slides undergo, and to the extent that these processing steps affect the endogenous autofluorescence emission from the sample, the effect should be similar for both stained and unstained samples.

In general, a wide variety of different sample preparation techniques using different combinations of dyes specific to certain sample targets, counterstains, and other sample labeling moieties can be used. The development of a specific multiplexed immunofluorescent sample preparation protocol for a particular purpose typically involves selection of primary antibodies, improvement/optimization of antibody and dye dilutions, and other immunohistochemical process development steps to maintain sample integrity and enhance selective dye binding to the sample. All such protocols can generally be used in the methods and systems described subsequently, except where expressly stated otherwise.

Returning to FIG. 1, after sample preparation is complete in step 102, the prepared sample is imaged in step 104 to obtain one or more sample images. Each of the sample images obtained in step 104 corresponds to a selected combination of illumination light within an excitation band, and fluorescence emission from the sample in response to the illumination light, measured in one or more emission bands.

Figure 2:
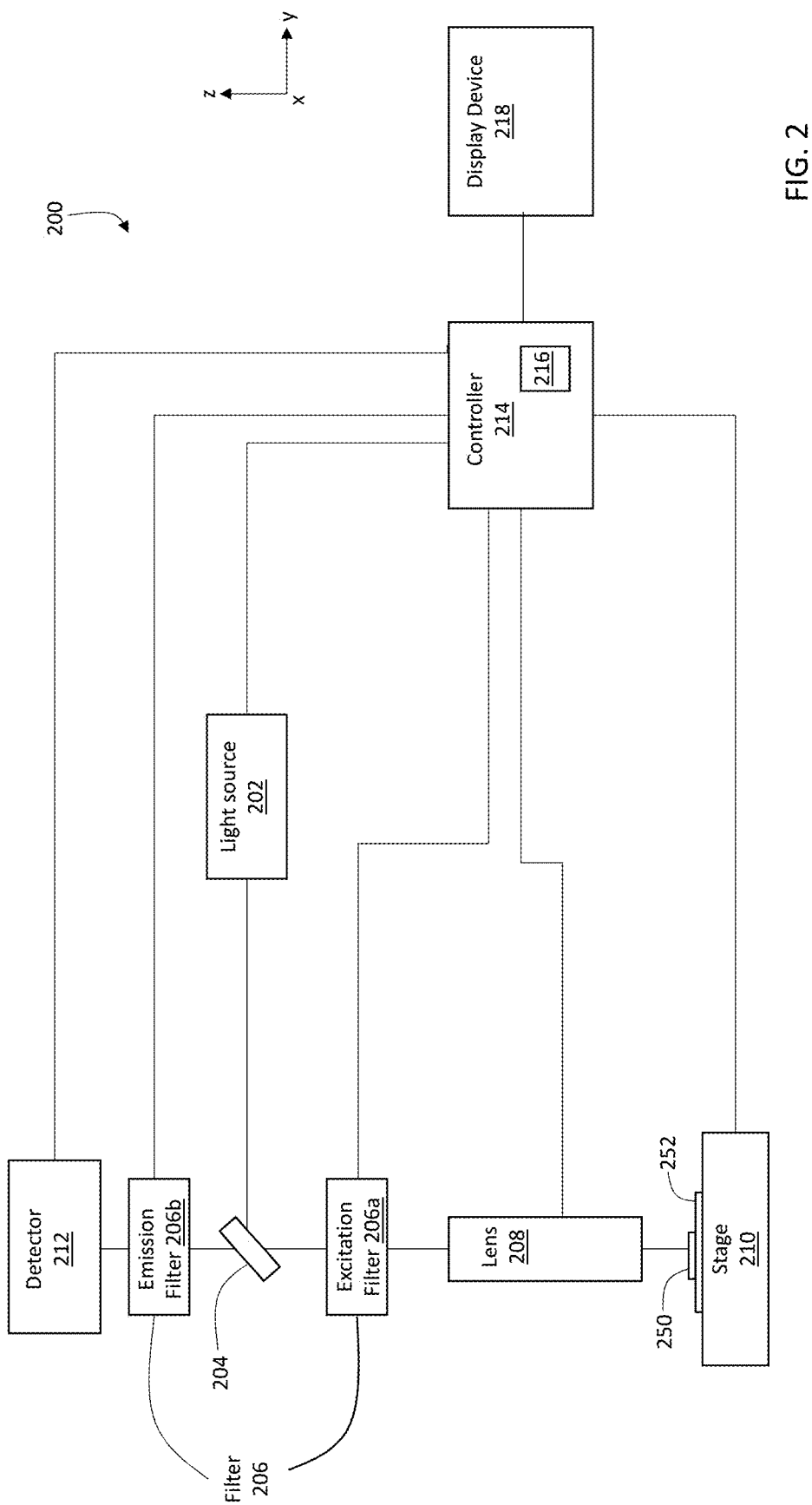
FIG. 2 is a schematic diagram of an example system for measuring sample autofluorescence.
Figure 5A:
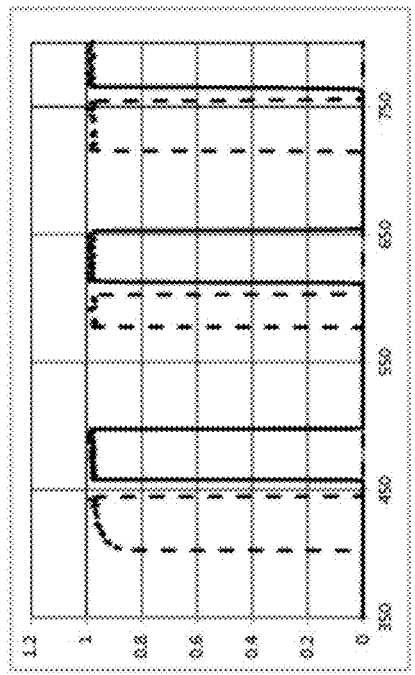
FIGS. 5A-5D are graphs showing spectral properties of four epi-filter cubes that can be used to measure sample fluorescence.
Figure 5B:
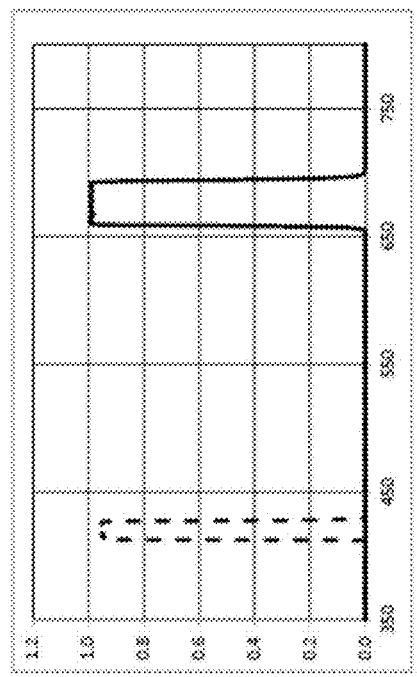
Figure 5C:
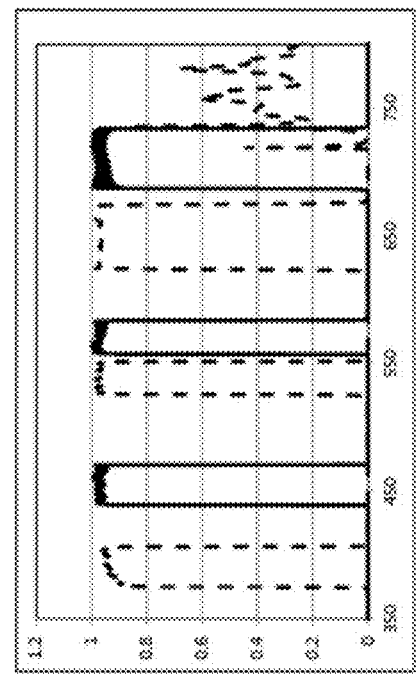
Figure 5D:
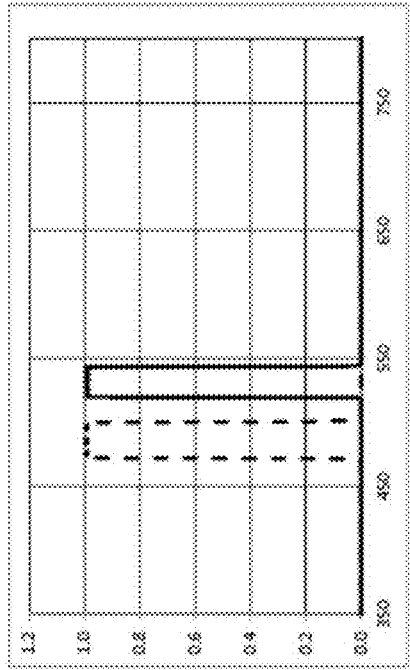

A variety of different sample imaging systems can be used to obtain sample images. An example of one sample imaging system 200, implemented as a fluorescence microscope, is shown in FIG. 2. System 200 includes a light source 202, a dichroic mirror 204, an optical filter 206 (implemented as an excitation filter 206a and an emission filter 206b), an objective lens 208, a stage 210, and a detector 212. Each of these components is coupled to a controller 214 that includes a processing device 216.

Controller 214 transmits and receives control and data signals from each of the system components, and can therefore control each of the components (more specifically, processing device 216 controls each of the system components). In certain embodiments, all of the steps and/or control functions described in connection with system 200 are performed by controller 214. Alternatively, in some embodiments, certain steps can be performed by a human operator of system 200.

Light source 202 is an adjustable source that can produce light having a variable distribution of illumination wavelengths. In some embodiments, for example, light source 202 includes a plurality of LEDs of different wavelengths that can be selectively activated by controller 214 to generate illumination light having desired spectral properties. In certain embodiments, light source 202 includes one or more laser diodes, lasers, incandescent sources, and/or fluorescent sources, each of which is controllable by controller 214.

The illumination light generated by light source 202 reflects from dichroic mirror 204 and is incident on optical filter 206. Filter 206 typically includes multiple filters, each of which can be selectively inserted into the path of the illumination light. Each of the filters has an associated excitation spectral band and one or emission spectral bands. Controller 214 adjusts filter 206 based on the illumination light generated by light source 202 to allow light of a suitable wavelength distribution to be incident on the sample.

Filter 206 can be implemented in various ways. In some embodiments, for example, filter 206 includes a plurality of different epi-filter cubes, each of which can be selectively rotated into the path of the illumination light by controller 214. In certain embodiments, filter 206 includes an adjustable filtering element (e.g., a liquid crystal based element) for which excitation and emission spectral bands can be selectively chosen by controller 214. Other implementations of filter 206 can also be used in system 200.

The filtered illumination light emerging from filter 206 is then focused by lens 208 onto the surface of sample 250, which is supported by a slide 252 that is mounted on a stage 210. Stage 210 permits movement of sample 250 in each of the x- and y-directions, and is controllable by controller 214. Motion of stage 210 in the x- and y-directions allows the filtered illumination light to be directed to different regions of the sample. By moving the sample relative to the focal region of the illumination light, illumination light can be directed to multiple different regions of the sample, permitting whole-slide imaging of sample 250.

The filtered illumination light generates fluorescence emission from sample 250, and the fluorescence that is emitted in the direction of lens 208 is collimated by lens 208 and passes through filter 206. As discussed above, filter 206—which can be adjusted by controller 214—defines one or more emission spectral bands. The fluorescence emission from sample 250 is filtered by filter 206 such that only light within the one or more emission spectral bands is transmitted by filter 206. The filtered fluorescence emission light is transmitted by dichroic mirror 204 and detected by detector 212.

Detector 212 can be implemented in various ways. In some embodiments, for example, detector 212 includes a CCD-based detection element. In certain embodiments, detector 212 includes a CMOS-based detection element. Detector 212 can also optionally include spectrally-selective optical elements such as one or more prisms, gratings, diffractive elements, and/or filters, to permit wavelength-selective detection of the filtered fluorescence emission light. In response to the incident filtered fluorescence emission light, detector 212 generates one or more electronic signals that represent quantitative measurements of the filtered fluorescence emission light. The signals are transmitted to controller 214 which processes the signals to extract measurement information corresponding to sample 250.

During operation, system 200 typically captures N different sample images, each of which corresponds to a different combination of an excitation wavelength band of filter 206 (which controls the spectral distribution of illumination light that is incident on sample 250) and one or more emission wavelength bands of filter 206 (which control the spectral distribution of fluorescence emission from sample 250 that is detected by detector 212). N is 1 or more, and in general can be any number (e.g., 2 or more, 3 or more, 4 or more, 5 or more, 6 or more, 7 or more, 8 or more, 9 or more, 10 or more, 12 or more, 15 or more, 20 or more, or even more).

In certain embodiments, N can be related to the number of non-endogenous spectral contributors in the sample. As used herein, a "non-endogenous spectral contributor" is a component of sample 250 that has been added to the sample, and that emits fluorescence when excited by illumination light from light source 202. Non-endogenous spectral contributors include the one or more dyes applied to sample 250, as discussed above. As an example, N can be equal to or greater than M, the number of non-endogenous spectral contributors in the sample.

Returning to FIG. 1, system 200 also typically captures one or more background images of the sample in step 106. The background image(s) can be captured after, before, or interleaved with, the capturing of the spectral images of the sample in step 104. The background image(s) correspond(s) to a combination of an excitation wavelength band of filter 206 and a background spectral band of filter 206. An important aspect of the background spectral band is that it is selected such that the non-endogenous spectral contributors in sample 250 do not generate significant fluorescence emission light within the background spectral band.

One example of a set of fluorescence emission spectral wavelength bands and the background spectral wavelength band is shown schematically in FIG. 3. In FIG. 3, seven different fluorescence emission spectral wavelength bands, B1-B7, are shown, along with a background spectral wavelength band, X. Each of the bands corresponds to a respective wavelength $\lambda_1$-$\lambda_7$ and $\lambda_X$, respectively, which represents the central wavelength of the spectral band, as determined from the full-width at half maximum (FWHM) spectral shape of each band. It should be noted that the discussion below refers to seven emission spectral wavelength bands B1-B7 for illustrative purposes only. In general, any number N of spectral wavelength bands can be used when capturing sample images, as discussed above.

The wavelengths $\lambda_1$-$\lambda_7$ define a wavelength range of the fluorescence emission spectral wavelength bands B1-B7. In some embodiments, the background spectral band X is selected such that the wavelength $\lambda_X$ falls within the wavelength range of the fluorescence emission spectral wavelength bands B1-B7. Alternatively, in certain embodiments, $\lambda_X$ falls outside this range. It can be advantageous for $\lambda_X$ to be within the wavelength range of the fluorescence emission spectral wavelength bands B1-B7 in certain implementations, as selecting the background spectral wavelength band in this manner allows for a larger spectral range to be dedicated to the fluorescence emission spectral wavelength bands, making isolation of the various fluorescence emission signals from sample 250 easier.

It should be noted that while in FIG. 3 the background spectral band X is separated spectrally from spectral wavelength bands B1-B7, this is not always the situation. In some embodiments, background spectral band X overlaps with portions of one or more spectral wavelength bands B1-B7. In general, background spectral band X can be selected such that it overlaps spectrally with none of the spectral wavelength bands corresponding to the non-endogenous spectral contributors, or alternatively, with one or more (e.g., two or more, three or more, four or more, or even more) of the spectral wavelength bands corresponding to the non-endogenous spectral contributors. As described below, even when spectral overlap occurs between background spectral band X and one or more of the spectral wavelength bands B1-B7, endogenous sample autofluorescence can still be measured by exciting the sample in a selected wavelength band, and then measuring sample autofluorescence in background spectral band X.

In general, the background image of the sample is obtained by detecting fluorescence emission from the sample in background spectral band X. In certain embodiments, some or all background images of the sample are obtained by detecting fluorescence emission from the sample in more than one background spectral band. Each of the background spectral bands that are used to detect fluorescence emission from the sample generally shares a common attribute: each of the non-endogenous spectral contributors in the sample does not generate significant fluorescence emission in the background spectral band when the sample is excited in a certain excitation wavelength band. Accordingly, by exciting the sample in a selected excitation wavelength band and measuring sample fluorescence in the background spectral band, a background image of the sample can be obtained which includes spectral contributions from substantially only sample autofluorescence, without significant contributions from non-endogenous spectral contributors such as applied dyes and counterstains.

FIG. 4 is a schematic diagram showing an example of the nature of the relationship between fluorescence emission from the non-endogenous spectral contributors and the background spectral band. To image a sample, the sample is exposed to illumination light in a band $W_{exc,i}$, and fluorescence emission from the excited sample is measured in an emission band $W_{emi,j}$. This procedure is repeated to obtain N sample images, each corresponding to a different combination of excitation band $W_{exc,i}$ and emission band $W_{emi,j}$. To obtain a background image of the sample, the example is exposed to illumination light in a background excitation band $W_{back,exc}$ and sample fluorescence is measured in a background spectral band $W_{back,emi}$.

For each non-endogenous spectral contributor in the sample, the spectral contributor will exhibit a maximum fluorescence intensity $I_{max}$ at a particular wavelength within the wavelength range defined by the emission bands $W_{emi,j}$. The maximum fluorescence intensity $I_{max}$ results from excitation with light in one of the excitation bands $W_{exc,i}$ and $W_{back,exc}$. In the methods and systems described herein, the background excitation band $W_{back,exc}$ and the background spectral band $W_{back,emi}$ are selected such that for any wavelength in the background spectral band $W_{back,emi}$, the intensity of the fluorescence emission from each non-endogenous spectral contributor is 10% or less (e.g., 8% or less, 6% or less, 5% or less, 4% or less, 3% or less, 2% or less, 1% or less, 0.5% or less, 0.25% or less, 0.1% or less, 0.05% or less, 0.01% or less, or even less) than the maximum fluorescence intensity $I_{max}$ of that non-endogenous spectral contributor.

In FIG. 4, a fluorescence emission intensity spectrum E(λ) for a non-endogenous spectral contributor excited by illumination light in the background excitation band $W_{back,exc}$ is shown. Also shown is the background spectral band $W_{back,emi}$ (which corresponds to spectral band X). Background spectral band $W_{back,emi}$ corresponds to a wavelength $\lambda_X$ (as discussed above) and includes a band of wavelengths $\lambda_{X1}$-$\lambda_{X2}$. To avoid fluorescence emission cross-talk in the background spectral band, for each wavelength in the range $\lambda_{X1}$-$\lambda_{X2}$, the fluorescence emission intensity E(λ) of the non-endogenous spectral contributor is 10% or less (e.g., 8% or less, 6% or less, 5% or less, 4% or less, 3% or less, 2% or less, 1% or less, 0.5% or less, 0.25% or less, 0.1% or less, 0.05% or less, 0.01% or less, or even less) of the maximum fluorescence emission intensity $I_{max}$ for the non-endogenous spectral contributor excited in any of the wavelength bands $W_{exc,i}$ and $W_{back,exc}$. By selecting the background spectral band X in such a manner, the background image of the sample that is captured by the system corresponds nearly entirely (or entirely) to autofluorescence emission from the sample.

In general, the background excitation and background spectral bands can be selected such that the above relationship holds for some or all non-endogenous spectral contributors in the sample. Moreover, when the background image of the sample is captured by detecting fluorescence emission in multiple background spectral bands, then the multiple background spectral bands can be selected such that the foregoing relationship holds for some or all of the background spectral bands (and some or all of the non-endogenous spectral contributors).

The background spectral band in FIG. 4 has a spectral shape that corresponds approximately to a square or "top hat" distribution. The edges of the distribution therefore define the wavelength range $\lambda_{X1}$-$\lambda_{X2}$ associated with the background spectral band. When background spectral band has a more complex shape, then the wavelength range associated with the background spectral band is determined based on the FWHM spectral range of background spectral band. Specifically, for a background spectral band having a FWHM spectral range of Δλ, centered at a wavelength $\lambda_c$, then the wavelength range associated with background spectral band extends from $\lambda_{X1} = \lambda_c - \Delta\lambda/2$ to $\lambda_{X2} = \lambda_c + \Delta\lambda/2$. The background spectral band can be selected such that the relationship described above between the fluorescence emission from the non-endogenous spectral contributors in the sample and the background spectral band holds within the wavelength range $\lambda_{X1}$ to $\lambda_{X2}$.

The background excitation band and background spectral band can also be selected according to other criteria to ensure that fluorescence emission cross-talk into the background spectral band remains relatively low. In some embodiments, for example, the background excitation band and background spectral band can be chosen such that for some or all non-endogenous spectral contributors, the integrated intensity of the non-endogenous spectral contributor in the background spectral band (i.e., the emission intensity summed between wavelengths $\lambda_{X1}$ and $\lambda_{X2}$) after excitation in the background excitation band is less than 5% (e.g., less than 4%, less than 3%, less than 2%, less than 1%, less than 0.5%, less than 0.3%, less than 0.2%, less than 0.1%, less than 0.05%, less than 0.01%) of the maximum integrated fluorescence emission intensity for the non-endogenous spectral contributor across all wavelengths in the wavelength range defined by the emission bands $W_{emi,j}$ when the non-endogenous spectral contributor is excited in the excitation bands $W_{exc,i}$.

In some embodiments, the background excitation band and background spectral band can be chosen such that when the sample is illuminated with light in the background excitation band, the integrated intensity of fluorescence emission from all non-endogenous spectral contributors in the sample is 10% or less (e.g., 8% or less, 6% or less, 4% or less, 2% or less, 1% or less, 0.5% or less, 0.25% or less, 0.1% or less, 0.05% or less, or even less) than the integrated intensity of all measured fluorescence emission in the background spectral band (i.e., due to both non-endogenous spectral contributors and sample autofluorescence).

It should also be recognized that in some embodiments, the background excitation band and background spectral band can be selected such that more than one of the foregoing conditions is satisfied.

Returning to FIG. 1, in the next step 108, an autofluorescence image of the sample is obtained. In some embodiments, due to the selection of the background spectral band X, the background image of the sample effectively corresponds substantially only to autofluorescence from the sample. Accordingly, the sample autofluorescence image corresponds directly to the sample background image, without any further processing.

In certain embodiments, the sample autofluorescence image can be extracted from the background image by decomposing the background image using a technique such as spectral unmixing. In spectral unmixing, the background image (which can be a multispectral image that includes emission intensity measurements at each of the wavelengths within the background spectral band X, and at each sample location of interest, to form a multispectral image cube) can be unmixed using pure estimates of the sample autofluorescence spectrum and the fluorescence emission spectra of each of the non-endogenous spectral contributors in the sample, to obtain an autofluorescence image of the sample. Because the background image of the sample contains only small contributions from each of the non-endogenous spectral contributors in the sample, the unmixing process is typically highly effective at isolating sample autofluorescence and generating an autofluorescence image. Suitable methods for spectral unmixing are described, for example, in U.S. Pat. No. 7,321,791 and in PCT Patent Application Publication No. WO 2005/040769, the entire contents of each of which are incorporated by reference herein.

Returning to FIG. 1, the sample images obtained in step 104 can be decomposed in step 110 to obtain a set of pure spectral contributor images, each of which includes substantially only contributions from one of the non-endogenous spectral contributors in the sample. It should be noted that in FIG. 1, steps 108 can occur sequentially (i.e., the autofluorescence image can be obtained first, followed by the pure spectral contributor images), or alternatively, steps 108 and 110 can occur concurrently (i.e., both the autofluorescence image and the pure spectral contributor images can be obtained at the same time, such as via a single spectral umixing procedure).

By performing decomposition step 110, the distribution of each of the applied dyes within the sample can be determined, and therefore, the distribution of the molecular targets associated with each of the dyes. Spectral unmixing can be used to perform the decomposition in step 110. In certain embodiments, when the sample autofluorescence distribution is already known from step 108, the spectral unmixing process used in step 110 can take account of the autofluorescence abundance information. A two-step spectral unmixing procedure which uses previously determined autofluorescence abundance information is discussed below.

Alternatively, steps 108 and 110 can be performed concurrently in a one-step spectral unmixing procedure.

Next, in step 112, amounts of one or more of the non-endogenous spectral contributors in the sample are determined. In effect, this step corresponds to determining quantitatively the distribution one or more non-endogenous spectral contributors, and therefore, the quantitative distributions of one or more molecular targets within the sample. Amounts of the non-endogenous spectral contributors can be determined directly using spectral unmixing, as the entries in the abundance matrix. Accordingly, in certain embodiments, steps 110 and 112 are performed together, as spectral unmixing yields both the spatial distribution and quantitative amounts of the non-endogenous spectral contributors at some or all locations within the sample.

In step 114, the autofluorescence image obtained in step 108 can optionally be displayed on a display interface or device 218 connected to controller 214. Moreover, in step 114, any of the pure spectral contributor images obtained in step 110 can optionally be displayed on interface 218. As described above, a system that displays some of all of these images represents a notable improvement to conventional fluorescence microscopes and other multispectral sample imaging devices, which are not able to determine sample autofluorescence and obtain pure spectral contributor images in the same manner. In particular, systems that determine sample autofluorescence and obtain pure spectral contributor images as discussed herein are able to acquire this information more quickly than conventional sample imaging devices, with reduced data storage requirements relative to conventional devices. For example, the number of spectral bands and/or wavelengths in which sample fluorescence is measured to obtain an accurate quantitative determination of endogenous autofluorescence is significantly reduced relative to conventional sample imaging devices. As a result, the amount of measured spectral information from the sample is reduced, and computationally intensive operations such as spectral unmixing proceed more rapidly.

The procedure in flow chart 100 then terminates at step 116.

It should be noted that the steps shown in flow chart 100 are not the only steps that can be performed in a sample analytical workflow. Other steps can also be performed prior to, concurrent with, or after any of the steps shown in FIG. 1. For example, between steps 110 and 116, the procedure shown in FIG. 1 can include an additional analysis step in which some or all of the pure spectral contributor images are quantitatively analyzed to determine one or more properties of the sample and/or its molecular targets. In general, any analytical procedures can be performed, including for example quantitatively determining statistical attributes associated with the distributions of various molecular targets.

In general, the procedure described in FIG. 1 permits sample autofluorescence to be quantitatively determined. Autofluorescence can be determined separately from the determination of the quantitative distributions of each of the non-endogenous spectral contributors in the sample. Further, in some embodiments, autofluorescence can be determined prior to the determination of the quantitative distributions of each of the non-endogenous spectral contributors in the sample. Alternatively, in certain embodiments, autofluorescence and the quantitative distributions of each of the non-endogenous spectral contributors are determined concurrently.

As a result, in some embodiments, the sample autofluorescence can be used to correct the raw spectral fluorescence emission measurements of each of non-endogenous spectral contributors. In certain embodiments, as discussed above, this correction occurs during decomposition (e.g., spectral unmixing), where the sample autofluorescence distribution is used in a two-stage unmixing procedure.

Alternatively, in some embodiments, sample autofluorescence can be used prior to unmixing of the sample images to adjust measured intensity values in the sample images directly. For example, in some or all of the raw multispectral sample images (and optionally, at some or all of the spatial locations within the images), measured spectral emission intensity values can be adjusted based on the amount of autofluorescence emission at corresponding locations in the sample, and at least one pure spectrum of the sample autofluorescence emission. Adjustments can be performed, for example, by subtracting autofluorescence contributions from the measured spectral emission intensity values. In samples where more than one sample autofluorescence emission spectrum is present (e.g., due to differences in autofluorescence emission in different sample regions, as will be discussed below), different pure spectra of sample autofluorescence emission can be used to perform the corrections in corresponding sample regions.

In general, the methods and systems described herein can use a wide variety of different filters to select suitable spectral excitation and emission bands for obtaining pure contributor and autofluorescence images of a sample. Further, in some embodiments, a sample background image can be obtained based on fluorescence emission measurements in more than one background spectral band. For example, a sample background image can be obtained from fluorescence emission measurements in two or more (e.g., three or more, four or more, five or more) background spectral bands. In general, when a sample background image is obtained from fluorescence emission measurements in more than one background spectral band, some or all of the background spectral bands satisfy the criteria discussed above.

For spectral unmixing operations, pure spectral estimates for the dyes and sample autofluorescence can be obtained in various ways. For example, dye spectra can be modeled based on the measured properties of the dyes and filters, as will be discussed below, but they can also be measured directly. For example, U.S. Pat. No. 10,126,242 describes methods for extracting the pure component spectrum from a singly-stained artifact sample, despite the presence of autofluorescence in the sample used for the measurement. The entire contents of U.S. Pat. No. 10,126,242 are incorporated herein by reference.

In certain embodiments, classification of pixel types can be combined with adaptive unmixing to improve unmixing accuracy. In other words, pixels in the autofluorescence image can be classified according to the type of sample material at each pixel (e.g., stroma, extracellular matrix, red blood cell, collagen), followed by unmixing at each pixel with type-specific pure spectral estimates to improve unmixing accuracy. Alternatively, or in addition, certain pixels in sample images can be excluded from further analysis based on the type of sample material to which they correspond (i.e., to the classification type determined for the pixel). For example, pixels classified as corresponding to red blood cells, and/or collagen, and/or extracellular matrix may not be of interest. Those pixels can be designated as outside a region of interest for the sample, and measured information corresponding to these pixels (e.g., spectral information) can subsequently be ignored. This can yield a significant reduction in analysis time for the sample. Information measured for those pixels can also optionally be deleted, reducing data storage requirements.

Conversely, in certain embodiments, pixels corresponding to sample structures such as collagen, stroma, extracellular matrix, and red blood cells can be preferentially analyzed and visualized by displaying an autofluorescence image in which pixels corresponding to sample structures that are not of interest are excluded (i.e., displayed as dark pixels).

As part of the spectral unmixing, the autofluorescence spectrum of each sample material type can be measured, resulting in type-specific autofluorescence spectra for the sample. These measurements can be performed on an adjacent serial section of the same sample to provide the most representative data. Alternatively, measurements may be based on a section of a different sample that shares the same organ type, or the same fixation conditions, or the same disease state, or some other property that recommends it as representative of the sample.

Spectra can be obtained by a human operator choosing pixel regions in the autofluorescence image of the sample, and then obtaining the spectra for the selected groups of pixels of each type. Alternatively, a trained machine classifier such as a neural network (e.g., implemented in processing device 216) can be used to perform the pixel region selections, and material type-specific autofluorescence spectra can be extracted in fully automated fashion. Using the type-specific autofluorescence spectra, an S matrix can be created for each type and inverted to yield a set of $S^+$ matrices to unmix pixels of each type of sample material.

To process a sample image using type-specific autofluorescence spectra, the autofluorescence image of the sample is classified, the type information associated with each pixel is used to select the appropriate $S^+$ matrix for that type of sample material, and pixel is unmixed to create an abundance vector A. To the extent that the actual sample autofluorescence is better matched by its type-specific spectrum than an overall average, the resulting unmixed images will more accurately indicate the true sample abundances.

The foregoing procedures can be used when pixels in a sample image correspond to different types of sample structures, with variations in endogenous autofluorescence that are associated with the different structures. Segmentation masks (or other spatial filtering techniques) can be used in conjunction with the foregoing procedures to exclude particular sample structures that are identified from the autofluorescence image. For example, adaptive unmixing can be combined with the exclusion of pixels corresponding to red blood cells and/or collagen from downstream analysis. Where red blood cells are preferably omitted from analysis, identifying and excluding them can be beneficial. Further, adaptive unmixing can provide more accurate quantitative information for surviving pixels having an autofluorescence spectrum that differs from the average sample autofluorescence spectrum, such as pixels that correspond to stromal cells or to the extracellular matrix.

One or more autofluorescence images can also be used for other applications. For example, in some embodiments, an autofluorescence image of sample obtained according to the methods described herein can be used to generate a synthetic H&E image (or another type of synthetic image) of the sample. In certain embodiments, where different regions of a sample are scanned according to a scanning pattern and the sample and background images are then assembled to form a larger image (e.g., a whole-slide image) of the sample, the autofluorescence spectra corresponding to different regions of the sample can be used to register sets of multispectral sample images that correspond to the different regions. That is, the autofluorescence spectra can be used for pixel-based registration of different sets of sample images.

In circumstances where multiple samples are examined, it should be appreciated that while the methods and systems describe herein permit endogenous autofluorescence to be measured for each sample, the endogenous autofluorescence spectrum can also be measured for only a subset of the samples, or from one or more witness or reference samples, and then the measured endogenous autofluorescence spectrum can be used in spectral unmixing operations performed on sets of sample images from other samples, where endogeneous autofluorescence for those other samples is not independently measured.

The methods and systems described herein are compatible with serial staining-and-imaging protocols, and can improve detection sensitivity in such protocols. In protocols of this type, a sample is incubated with n antibodies at once, and they are detected m at a time, by selectively engaging dyes and antibodies with DNA barcode technology. These protocols may attempt to image n up to 30 or more, and m is 3 or 4, so the number of imaging operations may range from 2 to 8, or even more. Other protocols can use the same broad principle, but techniques other than DNA barcode technology for selectively engaging the dyes and antibodies. In protocols, only m signals are typically imaged at a time, so isolating the dye signals from one another or from the counterstain is not usually too difficult. However, the measured signal levels may be moderate or low, especially for weak species. The methods and systems described herein can be particularly useful for isolating the sample autofluorescence that would otherwise confound detection of weaker signals. As a further benefit, the sample autofluorescence image that is obtained can be used to co-register sample images from successive imaging sessions.

Other features and aspects of systems for obtaining sample images and methods for analyzing and classifying spectral images are described, for example, in the following references, the entire contents of each of which are incorporated by reference herein: U.S. Pat. Nos. 8,634,607; 7,555,155; 8,103,331; U.S. Patent Application Publication No. US 2014/0193061; U.S. Patent Application Publication No. US 2014/0193050; and U.S. patent application Ser. No. 15/837,956.

Any of the method steps and other functions described herein can be executed by controller 214 (e.g., by processing device 216 of controller 214) and/or one or more additional processing devices (such as computers or preprogrammed integrated circuits) executing software programs or hardware-encoded instructions. Software programs, which can be stored on a wide variety of tangible, processing device-readable storage media, including (but not limited to) optical storage media such as CD-ROM or DVD media, magnetic storage media, and/or persistent solid state storage media. The programs, when executed by processing device 216 (or more generally, by controller 214), cause the processing device (or controller) to perform any one or more of the control, computing, and output functions described herein.

In addition to processing device 216, controller 214 can also optionally include other components, including a display or output unit, an input unit (e.g., a pointing device, a voice-recognition interface, a keyboard, and other such devices), a storage unit (e.g., a persistent or non-persistent storage unit, which can store programs and data measured by the system, and calibration and control settings), and transmitting and receiving units for sending and receiving data and control signals to other electronic components, including other computing devices.

EXAMPLES (1) Lung Cancer Sample

A lung cancer sample was prepared using the reagents listed in Table 1. TSA-biotin (Akoya Biosciences, Menlo Park, Calif.) was used to stain pan-cytokeratin (see Table 1) and a final incubation with Streptavidin, Alexa Fluor™ 750 conjugate (ThermoFisher Scientific, Waltham Mass.) was performed at 1:200 dilution for 1 hour at room temperature.

Sample images were obtained using the system shown in FIG. 2. Four epi-filter cubes were used in filter 206, having the optical responses shown in FIGS. 5A-5D, respectively. Light source 202 produced light in six independently controlled wavelength bands, with an adjustable brightness and electronic shutter capability for each band. The bands are tabulated in Table 2.

TABLE 2

| LED Channel | Center Wavelength | Bandwidth (FWHM) |
|---|---|---|
| UV | 385 ± 5 nm | 11 |
| Violet | 430 ± 5 nm | 18 |
| Blue | 475 ± 5 nm | 22 |
| Yellow | 550 ± 5 nm | 82 |
| Red | 638 ± 5 nm | 18 |
| NIR | 735 ± 5 nm | 32 |

The implementation of the system of FIG. 2 formed a compound, epi-illumination fluorescence microscope operating at infinite conjugate. All components were selected to have high lateral resolution and high transmission in the visible and near-infrared range (780 nm). The objective lens 208 was a Nikon 10× plan-apochromat with a focal length of 20 mm and a numerical aperture of 0.45 (Nikon USA, Melville, N.Y.). A tube lens (part of detector 212) was an apochromatic lens with focal length 145.2 mm, and the detector was an SCMOS Flash 2.8 sensor (Hamamatsu US, Bridgewater N.J.) with a pixel size of 3.63 microns square. The overall magnification was 7.26, and each pixel corresponded to 0.5 microns at the sample.

The first filter cube was a triple-band filter, with 3 distinct excitation bands and emission bands. By selecting which band of the light source was active, each excitation band was activated separately, without exciting the other bands. Because the light source was electronically controlled, the system was able to cycle through the excitation bands rapidly, without mechanical motion.

Three sample images were obtained in succession, corresponding to the response of the sample to each of the three excitation bands. Fluorescence emission light was detected in the three emission peaks shown in FIG. 5A. Thus, sample fluorescence summed over all 3 filter emission bands was detected in each image, while only one filter band was excited at a time.

Then, the second filter cube was placed in the optical path. The second filter cube was another triple-band filter, and was used in the same way as the first filter cube, with the light source activating the LEDs corresponding to the excitation bands in this filter cube. This provided another three images of the sample, corresponding to the sample fluorescence in response to each of these three excitation bands, as recorded through its 3 emission bands.

The third and fourth filter cubes were single-band filters, with one excitation and emission band each. These were each cycled into the optical path, and one image was captured with each.

This provided a total of eight images of the sample, at 8 different excitation and emission wavelength band combinations.

Stage 210 was used to sweep out a raster pattern while taking images of the sample. For speed, and to reduce the number of filter-change operations of mechanism, the pattern executed a group of 4 lines of the raster pattern path for each filter in turn, taking images at each site in a given row, and stepping through several rows. Then, the next filter was engaged, and the same pattern was executed, and its images were taken. This was continued until the group of rows had been imaged for all filters. Then, the raster pattern was continued for the next set of 4 rows. In this way, the entire sample was imaged using a total of 24 rows in 6 groups. Overall, the acquisition time was 4 minutes and 35 seconds for a sample scan measuring 12 mm×16 mm.

As part of the overall imaging operation, controller 214 created a map of the sample location, and measured focus at a grid of points within the sample region. This grid was used to set the focus mechanism of lens 208 during the raster scan. Normalized variance was used as the sharpness measure to select best focus, and the focus was interpolated for each image in the raster using a Delaunay triangle mesh to fit the resulting surface.

Software operating on controller 214 (and specifically, processing device 216) was used to process each image and create a whole-slide mosaic image containing 8 spectral channels corresponding to each filter and excitation combination. The individual images acquired during the raster imaging were each corrected for shading, using a different shading pattern for each filter and excitation setup. They were then assembled into a mosaic based on the known pixel size at the sample, and the raster pattern grid. This mosaic was saved as a pyramidal TIFF file using 512×512 pixel tiles and LZW lossless compression.

In spectral imaging, it is conventional to refer an image where every pixel contains measurements at a number of spectral bands as an image cube. This mosaic contains image cubes at several pyramidal resolution levels.

Two additional steps were performed. First, the epi-filters were characterized by measuring the pixel shift at the sensor produced when a sample was imaged with each filter in turn. Epi-filter optics will introduce an image shift unless the dichroic and emission filter elements are perfectly free of wedge. In practice, image shifts of 2-10 seconds of arc are typical even for so-called "zero-wedge" filter sets. This shift is systematic and repeatable. In the experiment being described, one pixel corresponds to 5.5 seconds of arc.

Based on the measured pixel shift at the sensor, and the known pixel size of 0.5 microns, the stage locations were offset from the nominal values during the raster scan so as to oppose the wedge produced by each filter. Thus the stage location used for a given field in the raster was very slightly different when imaging with the first filter than for each of the subsequent filters, to counter the optical shift of the epi optics. In this way, a pixel in the image corresponds to the exact same point in the sample despite the optical shift introduced.

Second, residual chromatic focus shift was measured for the objective, based on measuring best focus of a sample for all filter and excitation band combinations. During imaging, the focus setting was shifted by this amount, synchronously with the epi-filter selection and LED band selection, to compensate for this effect. If one denotes the focus dimension as the z-direction, this procedure seeks to record exactly the same layer of the sample along the z-direction in all spectral channels in the resulting multispectral image.

Once the image was acquired as described above, an unmixing step was performed to separate the spectral channels of the mosaic into estimates of the contributions from each pure spectral contributor. As described above, each pure spectral contributor corresponded to one of the applied dyes (or counterstain), or to the endogenous autofluorescence of the sample.

The spectral response was modeled for each dye and counterstain taking account of the LED signal, the camera response, the excitation filter responses and emission responses, and the measured excitation and emission responses for each dye and counterstain. This was done in the open-source R programming environment (R Foundation for Statistical Computing; Vienna, Austria). The results are shown in Table 3, as the first 7 data rows, corresponding to the spectral bands named B1-B7 in that table.

TABLE 3

| Filter | LED | Spectral Band Name | DAPI | Dy 431 | Opal 520 | Opal 570 | Opal 620 | Opal 690 | Cy7 |
|---|---|---|---|---|---|---|---|---|---|
| 206 | UV | B1 | 1.000 | 0.041 | 0.001 | 0.001 | 0.000 | 0.002 | 0.000 |
| 205b | Violet | B2 | 0.013 | 1.000 | 0.014 | 0.005 | 0.000 | 0.004 | 0.002 |
| 205c | Blue | B3 | 0.000 | 0.059 | 1.000 | 0.002 | 0.000 | 0.000 | 0.000 |
| 205a | Yellow | B4 | 0.000 | 0.000 | 0.008 | 1.000 | 0.041 | 0.013 | 0.000 |
| 205b | Yellow | B5 | 0.000 | 0.000 | 0.000 | 0.031 | 1.000 | 0.005 | 0.021 |
| 205a | Red | B6 | 0.000 | 0.000 | 0.000 | 0.000 | 0.036 | 1.000 | 0.005 |
| 205b | NIR | B7 | 0.000 | 0.000 | 0.000 | 0.000 | 0.002 | 0.021 | 1.000 |
| 205c | Violet | X | 0.000 | 0.000 | 0.000 | 0.000 | 0.014 | 0.010 | 0.000 |

Figure 6A:
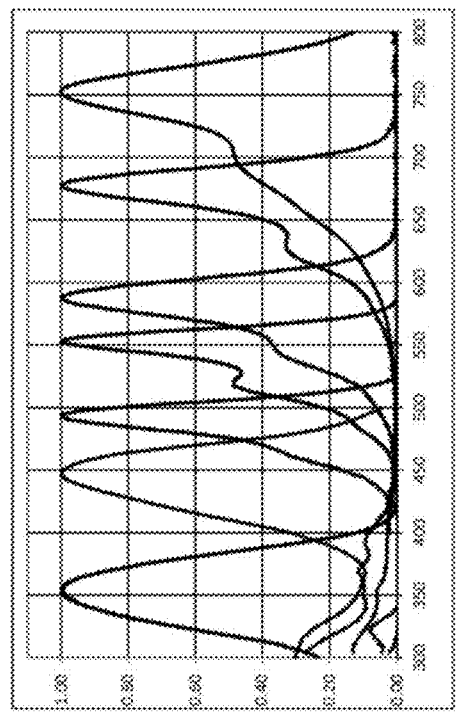
FIG. 6A is a graph showing dye excitation responses for a counterstain and six dyes used as immuno-fluorescent labels.
Figure 6B:
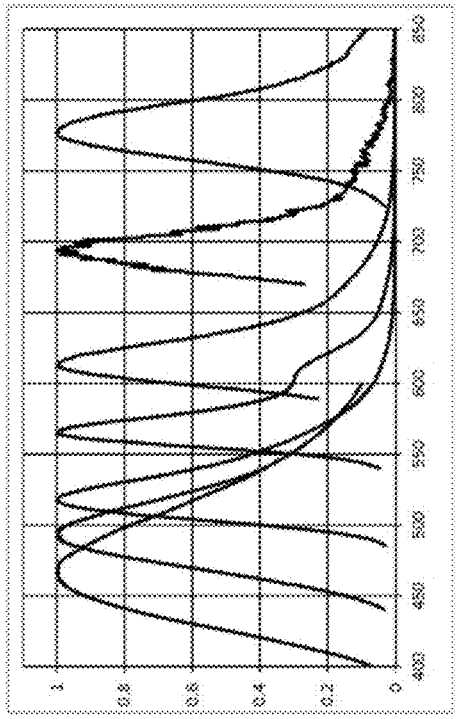
FIG. 6B is a graph showing fluorescence emission responses for the counterstain and dyes of FIG. 6A.
Figure 6C:
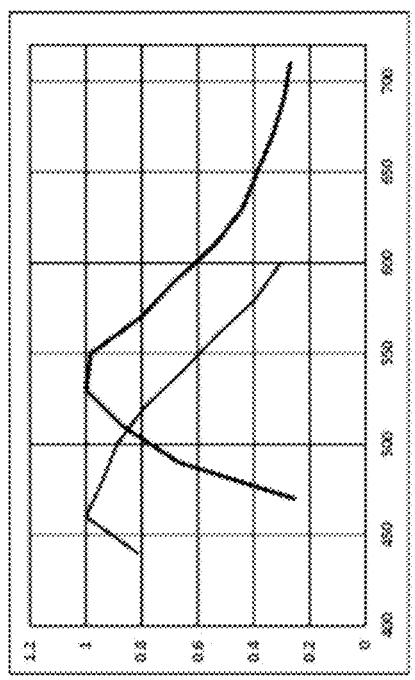
FIG. 6C is a graph showing autofluorescence emission from a formalin-fixed, paraffin-embedded lung cancer sample when excited at 387 nm, and when excited at 425 nm as 604.

FIG. 6A shows dye excitation responses for the above counterstain and six dyes used as immuno-fluorescent labels, and FIG. 6B shows the emission responses. FIG. 6C shows the emission response of autofluorescence in a formalin-fixed paraffin-embedded lung cancer sample when excited at 387 nm, and when excited at 425 nm.

Alternatively, pure spectra (or spectral library entries) can be derived from measured information. For example, to obtain a spectral library entry for autofluorescence, a sample with no immuno-fluorescent labels can be imaged to obtain measured images in 8 individual spectral bands, the strength of autofluorescence signal is extracted for individual pixels, and the signal strengths are scaled by exposure time, to produce a time-normalized autofluorescence spectrum following the normalization step.

To obtain a spectral library entry for an individual dye used in immuno-fluorescent labeling, a sample can be prepared with primary antibody, secondary antibody, and/or dye, using antigen retrieval solution, blocking buffer, wash reagents and other ancillary reagents, to produce a singly stained sample. This sample is imaged to obtain measured images in 8 individual spectral bands, the strength of the combined dye and autofluorescence signals is extracted for individual pixels, the signal strengths are scaled by exposure time, and the signals are corrected for the autofluorescence contribution to obtain a time-normalized corrected dye spectrum.

To obtain a spectral library entry for a counterstain such as DAPI, where the sample is prepared with the counterstain to produce a counterstained sample, the sample is imaged to obtain measured images in 8 individual bands, the strength of the combined dye or counterstain signal plus the autofluorescence signal is extracted for individual pixels, the signal strengths are scaled by exposure time, and the signals are corrected for the autofluorescence contribution to obtain a time-normalized corrected counterstain spectrum.

Two samples were prepared, one stained with only Opal620 and one stained with only Opal690. These were then imaged and the relative response was measured in bands B5, B6, and X. This was used to populate the X band row of Table 3 for these two dyes. Measurements on singly-stained dye samples for the other dyes showed no measurable response in the X band.

Table 3 shows the relative response of each dye for an image where all spectral bands have equal exposure times, normalized by the signal level in the brightest band. It is often useful to scale signal counts by the exposure time and to perform calculations in units of counts per unit time, such as counts per millisecond. Signal levels in a scientific digital camera are proportional to exposure time, and scaling by exposure time provides two practical benefits. First, it enables one to perform spectral calculations on images taken where the different spectral bands have unequal exposure times, in exposure-scaled counts, so that the spectra are unaffected by the acquisition conditions. Second, and for the same reason, it enables one to compare spectra or perform spectral calculations involving multiple images, where the images have different exposure times from one another. This approach was used in present procedure.

Next, two FFPE samples which had no dyes applied were imaged using the same apparatus and method described above. This yielded pyramidal mosaic image cubes with spectral bands B1-B7 and X. One sample was a lung cancer section, and the other was a breast cancer section, each 4-5 microns thick.

The spectra were measured at various locations corresponding to recognizable biological structures such as stroma, red blood cells, generalized extracellular matrix, collagen, and so on. This measurement was done by taking a pixel-average of the signal in a group of pixels chosen to represent the structure of interest. This was done by exporting images from each of the individual spectral band planes from the pyramidal TIFF image, and then assembling the planes into an image cube using Nuance® software from Akoya Biosciences (Waltham, Mass.).

In addition to measuring the spectra for pixel groups chosen to correspond to particular biological structures, a measurement was made along an irregular path extending across a large variety of structures, to obtain a structural-average spectrum.

The resulting spectra are given in Table 4 for four types of structures in the lung cancer tissue sample, and its average, and in Table 5 for seven types of structures in the breast cancer tissue sample, along with its average. All of these are listed in time-scaled units of counts per millisecond.

TABLE 4

| | | Lung Cancer Sample | | | | |
|---|---|---|---|---|---|---|
| Filter | LED | Collagen Structures | Red Blood Cells | Extra-cellular matrix | Stroma Cells | Average |
| 205a | UV | 5.017 | 4.119 | 2.217 | 2.127 | 2.315 |
| 205b | Violet | 5.841 | 4.280 | 0.901 | 1.826 | 1.434 |
| 205c | Blue | 1.010 | 0.851 | 0.121 | 0.271 | 0.210 |
| 205a | Yellow | 0.187 | 0.167 | 0.023 | 0.059 | 0.041 |
| 205b | Yellow | 0.073 | 0.071 | 0.008 | 0.028 | 0.016 |

TABLE 4-continued

Lung Cancer Sample

| Filter | LED | Collagen Structures | Red Blood Cells | Extra-cellular matrix | Stroma Cells | Average |
|---|---|---|---|---|---|---|
| 205a | Red | 0.038 | 0.040 | 0.002 | 0.021 | 0.006 |
| 205b | NIR | 0.005 | 0.003 | 0.002 | 0.003 | 0.002 |
| 205d | Violet | 0.181 | 0.130 | 0.039 | 0.072 | 0.039 |

TABLE 5

Breast Cancer Sample

| Filter | LED | Collagen Structures | Red Blood Cells | Tumor non-nuclear | Tumor nuclear | Stroma matrix | Stroma cells | Stroma puncta | Average |
|---|---|---|---|---|---|---|---|---|---|
| 205a | UV | 4.083 | 4.019 | 1.680 | 1.429 | 1.736 | 2.155 | 3.126 | 1.702 |
| 205b | Violet | 4.101 | 4.762 | 1.400 | 1.061 | 1.258 | 1.846 | 2.948 | 1.326 |
| 205c | Blue | 0.516 | 0.826 | 0.175 | 0.114 | 0.139 | 0.252 | 0.363 | 0.154 |
| 205a | Yellow | 0.069 | 0.142 | 0.032 | 0.020 | 0.023 | 0.045 | 0.049 | 0.026 |
| 205b | Yellow | 0.027 | 0.061 | 0.017 | 0.012 | 0.011 | 0.020 | 0.018 | 0.012 |
| 205a | Red | 0.024 | 0.052 | 0.014 | 0.011 | 0.012 | 0.016 | 0.017 | 0.012 |
| 205b | NIR | 0.003 | 0.007 | 0.003 | 0.004 | 0.003 | 0.004 | 0.004 | 0.003 |
| 205d | Violet | 0.077 | 0.109 | 0.045 | 0.039 | 0.042 | 0.053 | 0.062 | 0.043 |

Based on these, spectral unmixing was performed. In a linear system of independent spectral contributors, the following linear algebraic equation can be used to describe the measured spectrum at any image pixel:

$$M = S * A \quad [1]$$

M is the measured spectrum at a given pixel, S is a matrix whose columns are the spectra of the individual components (dye, counterstain, or autofluorescence), and A is a column vector with the abundances of the components in the sample. In other words, Equation (1) states that the measured signal M is a linear superposition of components in the sample with spectra S, according to their abundance A.

If a pseudo-inverse $S^+$ exists for S, one can left-multiply both sides of Equation [1] by it, to obtain $$S^+ * M = S^+ * S * A = (S^+ * S) * A = I * A = A \quad [2a]$$

Thus $$A = S^+ * M \quad [2b]$$

Equation (2b) is the central spectral unmixing equation, which enables one to calculate the abundance vector A for the pure spectral contributors in the sample by left-multiplying the measured spectrum M at a given pixel by the pseudo-inverted spectral matrix $S^+$.

In the present example, the goal is to unmix the measured signal into contributions from the 6 immuno-labeling dyes, the DAPI counterstain, and the tissue autofluorescence. Accordingly, S has 8 columns, corresponding to the seven dye (or counterstain) spectra, along with an autofluorescence spectrum. The lung-cancer average spectrum, normalized by the signal level in the brightest band, was used for the autofluorescence spectrum.

Each column had 8 entries, corresponding to bands B1-B7 and X, meaning S was an 8×8 matrix. Because S was square, $S^+$ was calculated by direct inversion. More generally, $S^+$ can be calculated by methods well-known in linear algebra, such as the Moore-Penrose technique.

The resulting $S^+$ matrix contained the coefficients that transform a raw spectral measurement M of a sample pixel into a vector of pure contributor abundances A, in time-scaled measurement space. It was used to transform the raw spectral mosaic image, in which each pixel contained measured signals M, into an unmixed mosaic image in which each pixel contained the abundances A of the individual pure spectral contributors (i.e., the dyes, counterstain, and the endogenous autofluorescence).

The raw sample images corresponding to bands B1-B7 and X are shown in FIGS. 7A-7H, and the unmixed pure spectral contributor images are shown in FIGS. 8A-8H. The images in FIGS. 7A-7H and 8A-8H show only a selected region of the sample. FIGS. 9A-9H show unmixed pure spectral contributor images of the entire sample.

Figure 7A:
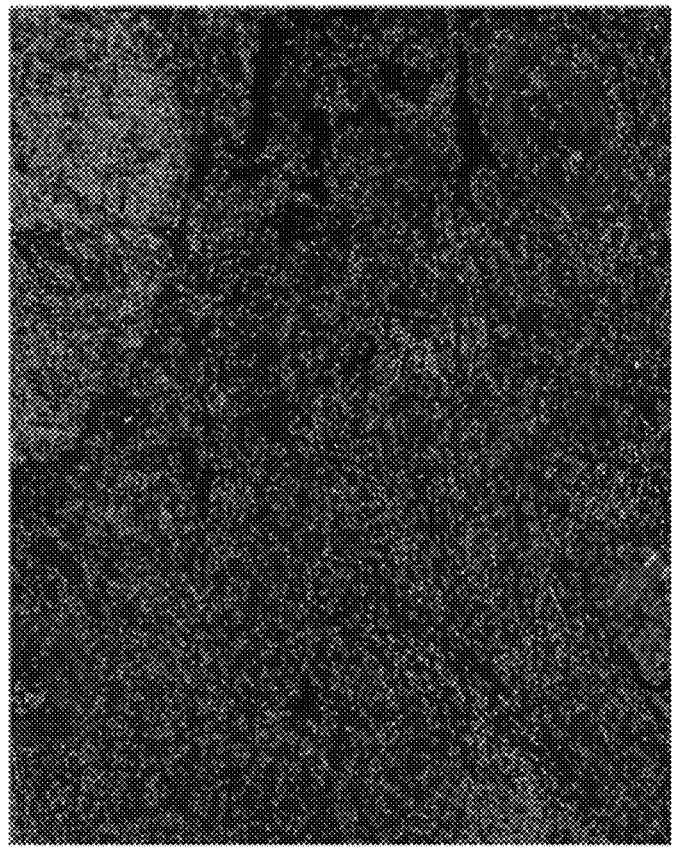
FIGS. 7A-7H are sample images and a background image obtained following excitation of a sample and measurement of sample fluorescence in different combinations of spectral excitation wavelength bands and spectral emission wavelength bands, each of the images showing a portion of the sample.
Figure 7B:
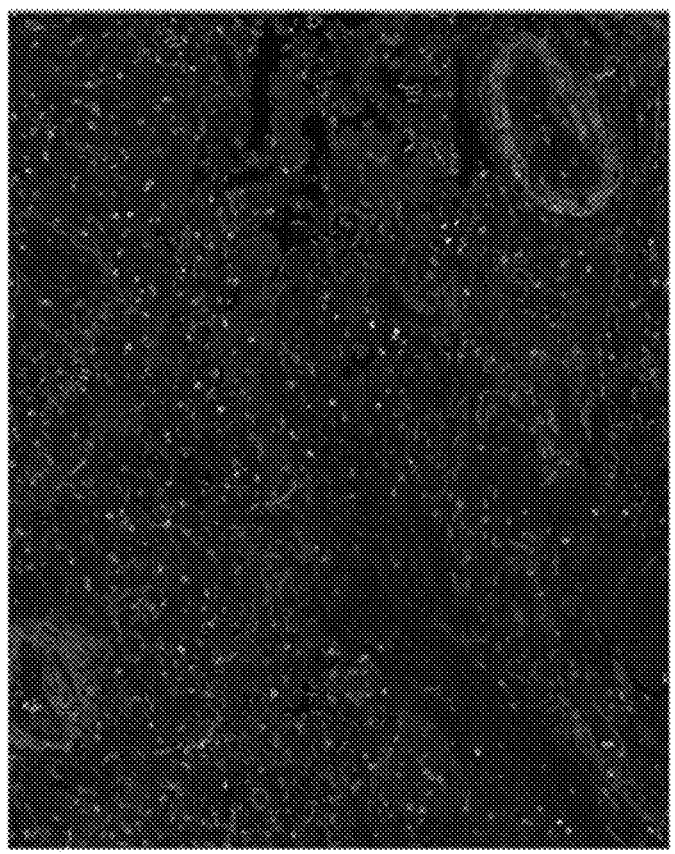

Comparison of pairs of images demonstrates the ability of the methods and systems described herein to provide accurate quantitative information about molecular targets in samples. For example, FIG. 7B shows the raw image for B2, which is the primary spectral band where Dy430 emission was observed. This dye was a marker for CD8 in the sample. In FIG. 7B, one can see contributions associated with CD8, which localized primarily in membranes of lymphocytes, specifically cytotoxic T-cells. These were evident as compact bright rings in FIG. 7B.

But there are many other structures visible in FIG. 7B that are unrelated to true CD8 localization in the sample that make this image an unreliable indicator of that type of cell. For example, there is a general background signal level in the extra-cellular matrix; large, bright, irregular features that appear to be collagen structures; and other cells in the tissue. Overall, the majority of the signal was due to sources other than the CD8 label.

This interference makes it more difficult to accurately identify the presence, number, or location of cytotoxic T-cells, and tends to degrade an assay based on such one or more of these measures. Based on the location and shape of the confounding features, the interference arises primarily from endogenous tissue autofluorescence rather than from other dyes used to label the sample.

Figure 8A:
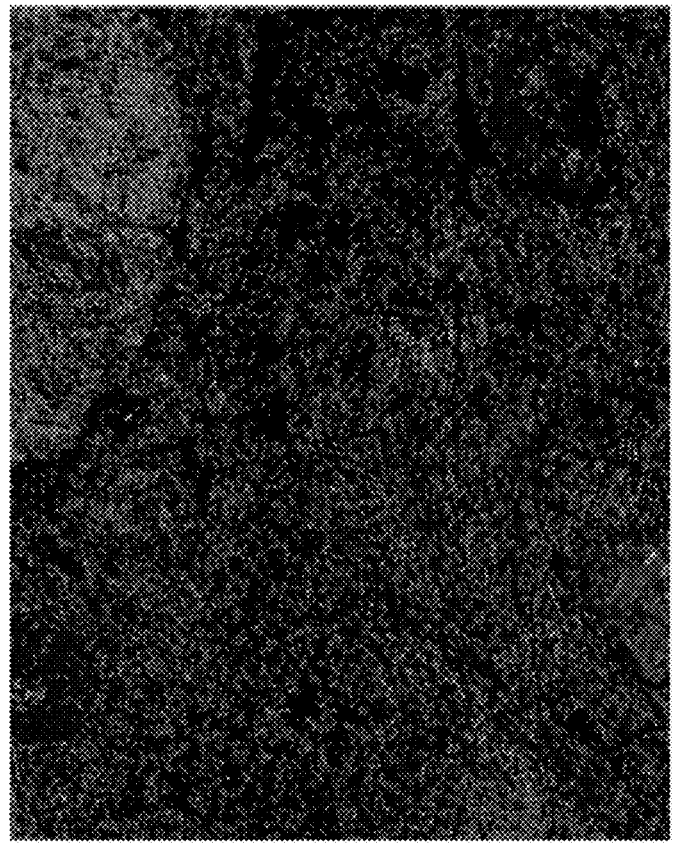
FIGS. 8A-8H are pure spectral contributor images and an autofluorescence image for the sample of FIGS. 7A-7H, obtained from unmixing the sample and background images, each of the images showing a portion of the sample.
Figure 8B:
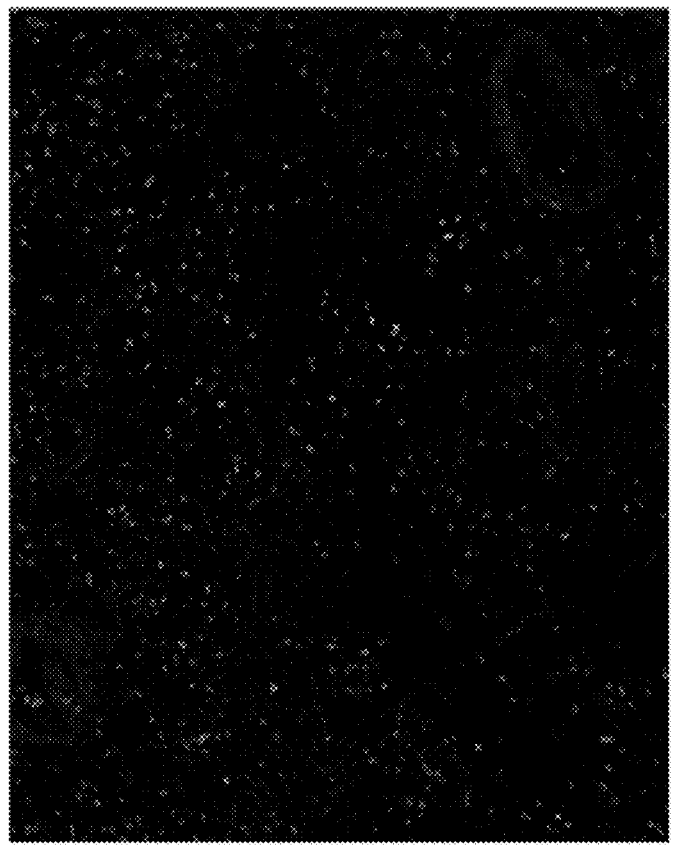

FIG. 8B is the unmixed pure spectral contributor image associated with the dye Dy430. Comparing this against FIG. 7B, the interfering signals associated with endogenous tissue are either weak or completely absent. Yet, the true CD8-associated features seen in the image of FIG. 7B are present without apparent reduction in strength. Also, several faint CD8 ring features are observed that are difficult to locate in FIG. 7B because of background or interfering signals. This illustrates at once the benefits of multispectral imaging and spectral unmixing as a technique for isolating signals and removing autofluorescence.

A comparison of other raw spectral images against the unmixed component abundance images for DAPI, Opal520, and Opal570 shows comparable effectiveness in isolating the desired component from interference from autofluorescence. In FIG. 8A, the DAPI pure spectral contributor abundance image, this nuclear counterstain is used to identify, segment, and count tumor and stroma cells. The DAPI image in FIG. 8A provides this information essentially free from unwanted other content, whereas the raw spectral in FIG. 7A contains many small, bright structures that do not correspond to DAPI stain. These structures appear to arise from endogenous tissue autofluorescence. The spectral image shown in FIG. 7A corresponds to a narrow-band excitation and emission filter that were chosen to be optimal for fluorescent imaging of DAPI. To the extent that the filter selection was indeed optimal, the signal-to-noise shown in this image—its ability to discern the desired DAPI signal without other confounding signals—illustrates the best performance that conventional whole-slide imaging can achieve.

Similarly, Opal570 was used to label FoxP3 proteins in the sample, which tend to localize in nuclei of regulatory T-cells (e.g., "Treg" cells). The unmixed pure spectral contributor image in FIG. 8D (corresponding to Opal570) shows clean labeling of nuclei. This indicated that the immuno-fluorescent labeling of FoxP3 achieved high specificity, so the Opal570 label appears to be localized to the intended structures. Brightly-labeled Treg cells show 150-250 counts, and fainter cells expressing 50 counts are easily detectable against a low background of 10 counts or less. In contrast, the raw sample image in FIG. 7D has much more general background, with many kinds of structures having signal levels of 25 counts that do not correspond to true FoxP3.

Figure 7D:
Figure 7C:
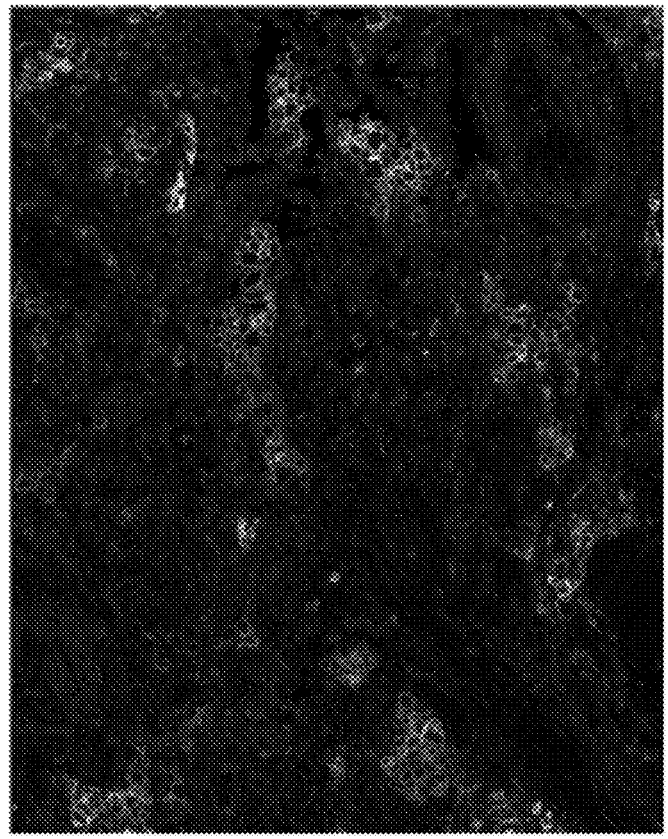
Figure 7E:
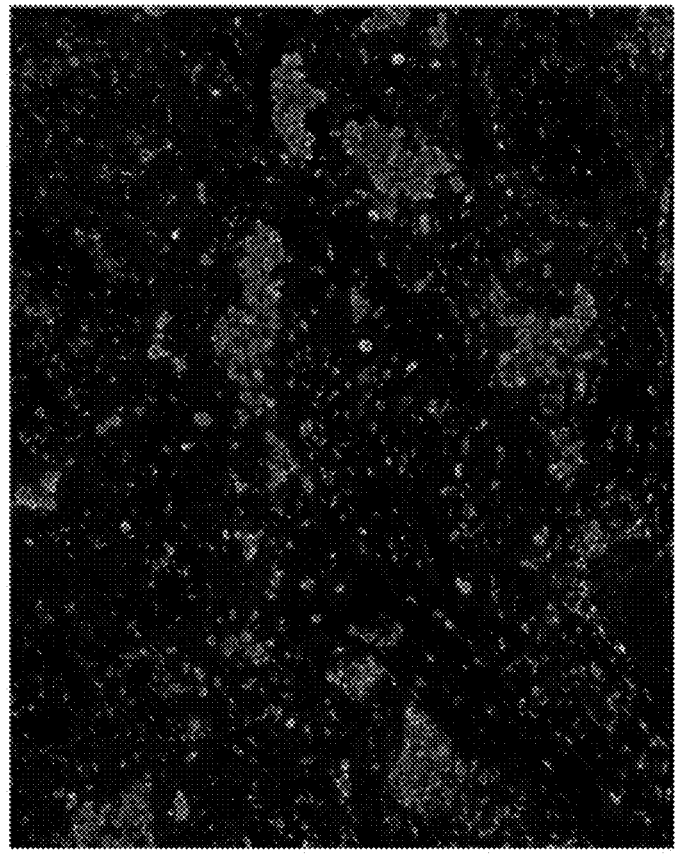
Figure 7F:
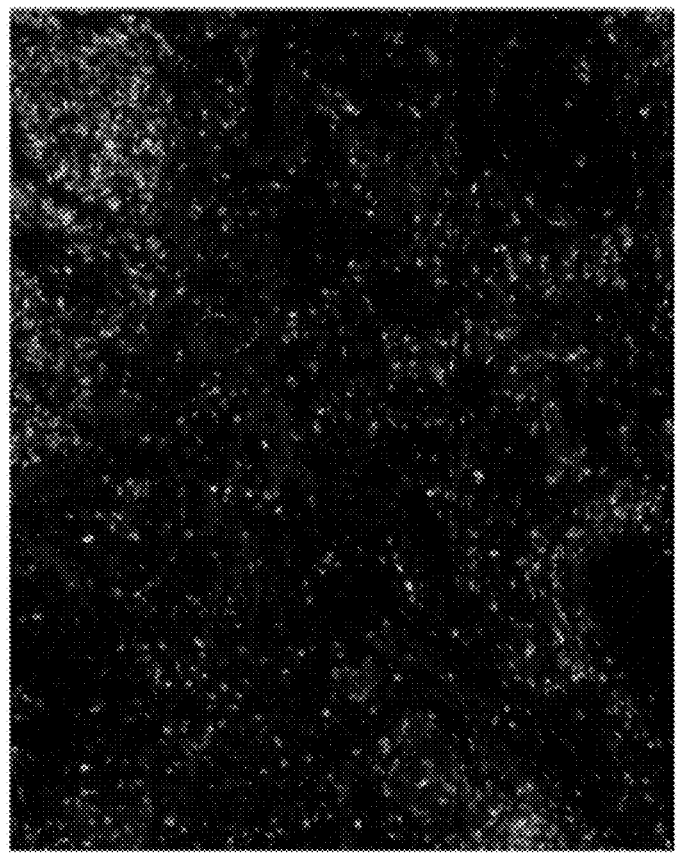
Figure 7H:
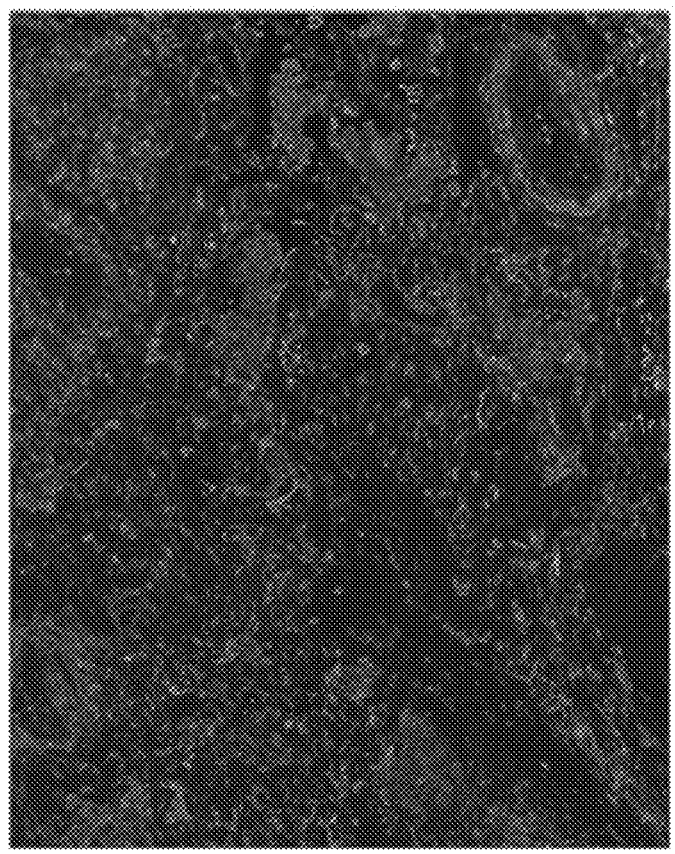
Figure 7G:
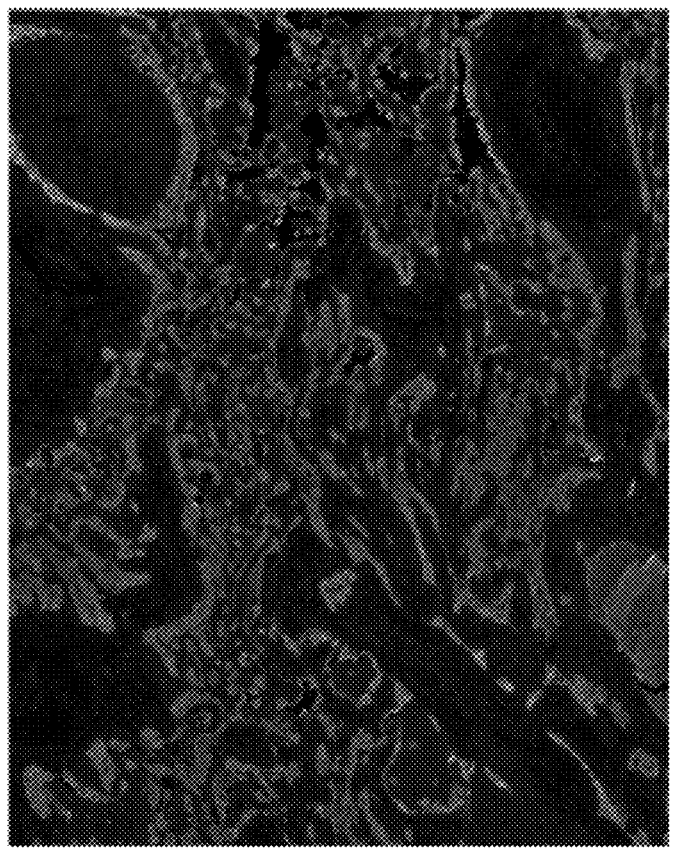

Next, consider FIG. 7H, which is the raw sample image at band X. The excitation filter and emission filter for this band were chosen to detect endogenous autofluorescence from FFPE samples, rather than any counterstain or dye. Further, they were chosen to be as insensitive as possible to the counterstain and dye(s) applied to the sample, so it is possible to obtain an image of endogenous autofluorescence in a sample despite the presence of 4 or more dyes. In general, multispectral sample imaging protocols do not include selecting excitation and emission wavelength bands with these properties. To the contrary, conventional methods for obtaining an image of endogenous autofluorescence in such a sample involves spectrally unmixing a multispectral image cube where one of the spectra is autofluorescence, and looking at the autofluorescence abundance image. In such cases, the raw spectral cube typically includes a high number of spectral channels to separate the autofluorescence signal from the other fluorescent signals in the sample. This greatly increases computational time and data storage, making it impractical for many uses, such as whole-slide scanning or digital pathology workflows.

In contrast, band X is only weakly affected by other signals, particularly due to non-endogenous dyes and counterstains. This makes it much easier to obtain an accurate estimate of endogenous sample autofluorescence without a high number of spectral channels. For example, in some circumstances, only one spectral channel (i.e., a single wavelength measurement) is used for each dye and counterstain, plus one for autofluorescence.

Figure 8D:
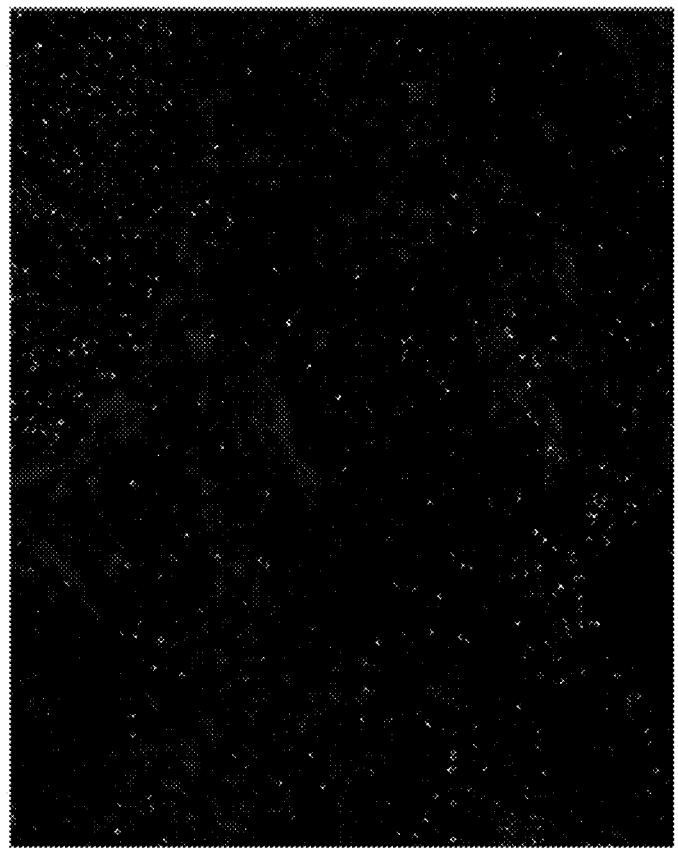
Figure 8C:
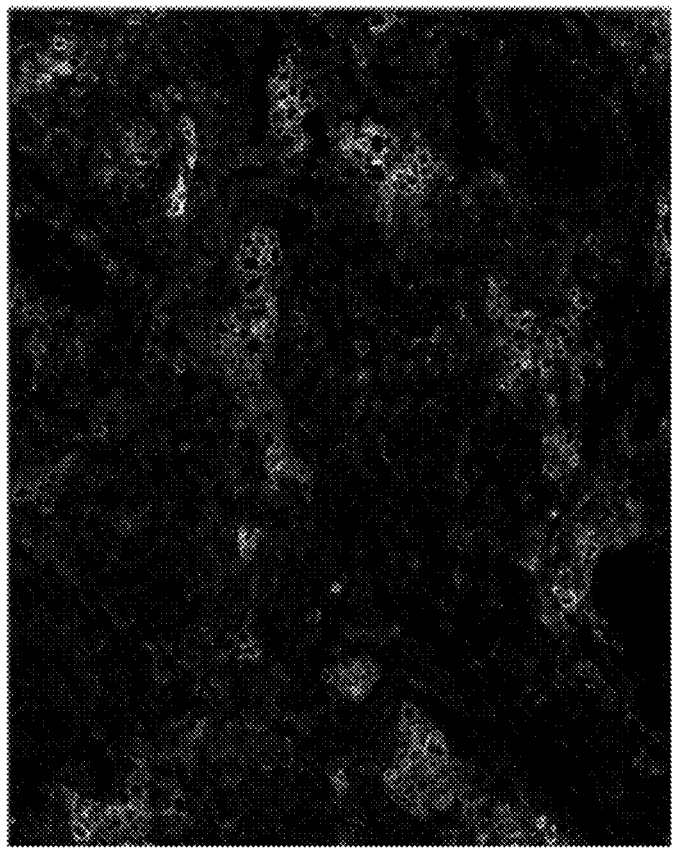
Figure 8E:
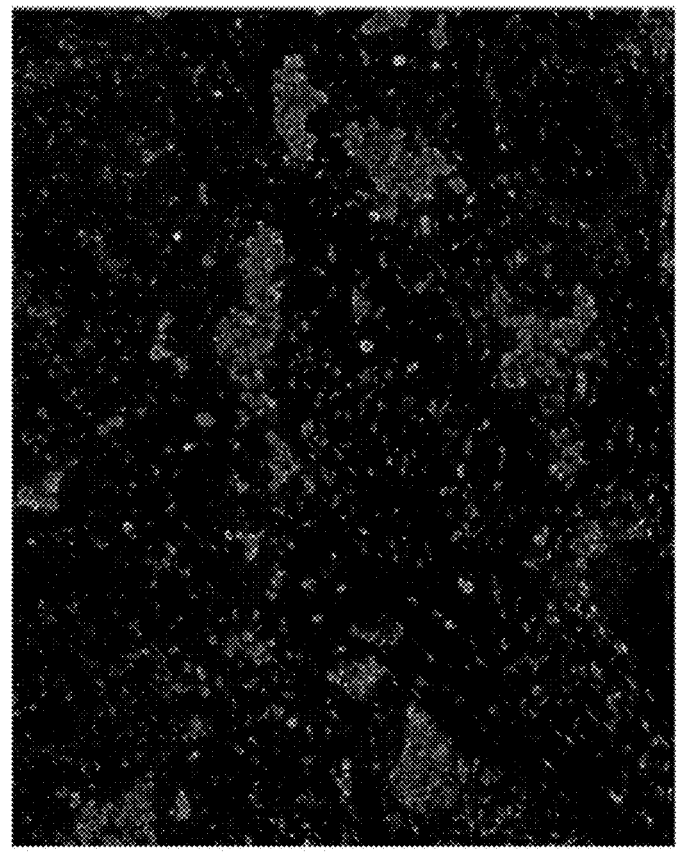
Figure 8F:
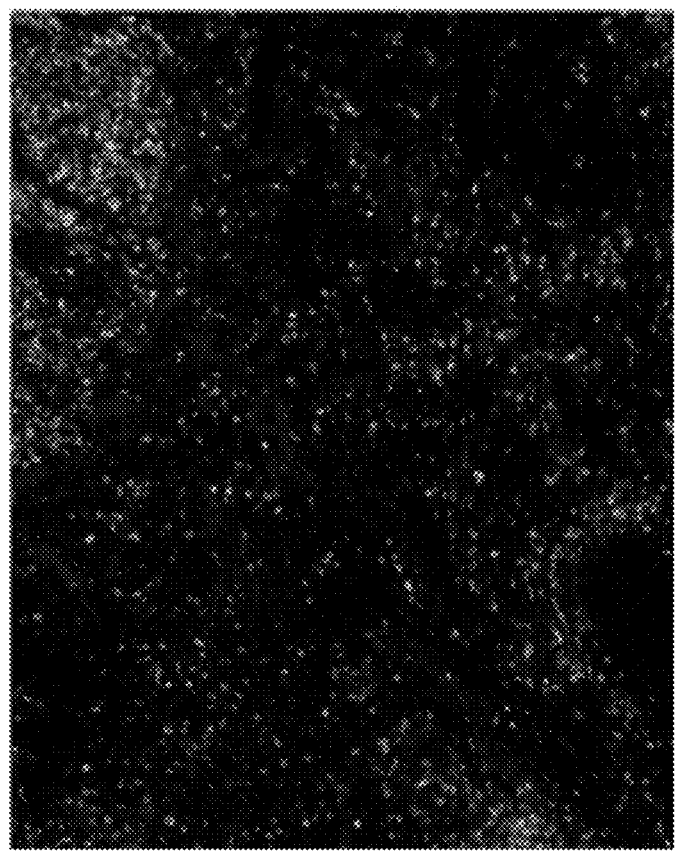
Figure 8H:
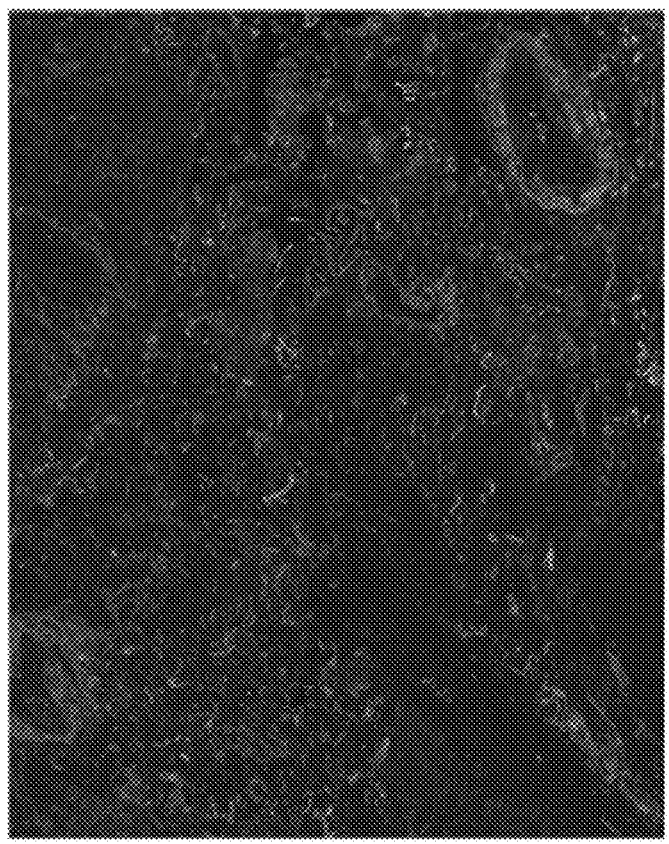
Figure 8G:
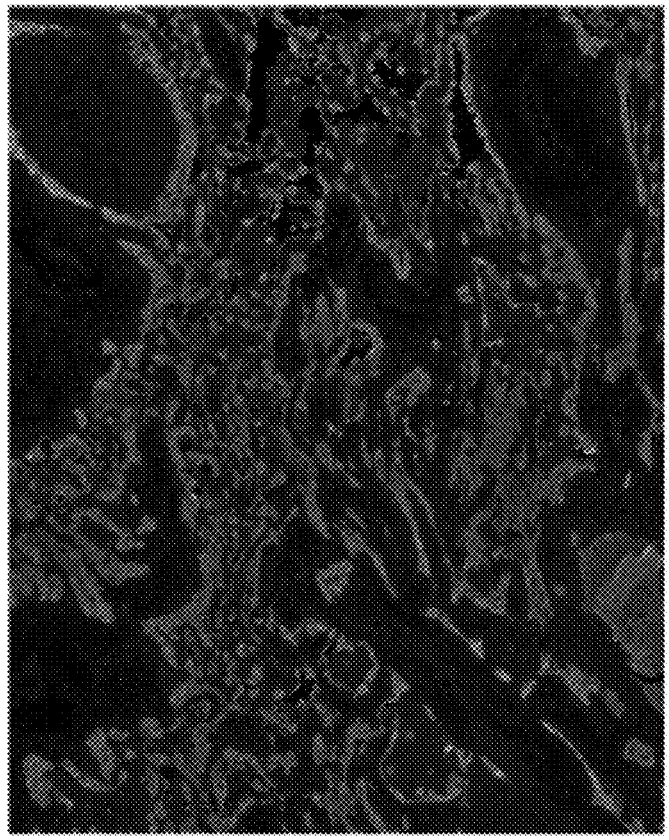
Figure 9A:
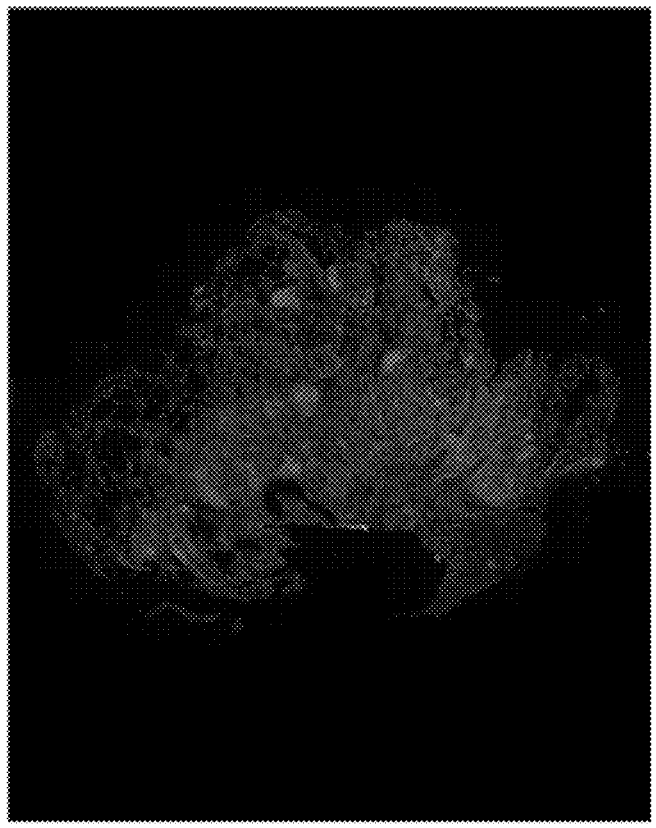
FIGS. 9A-9H are pure spectral contributor images and an autofluorescence image for the sample of FIGS. 7A-7H, obtained from unmixing the sample and background images, each of the images showing the entire sample.
Figure 9B:
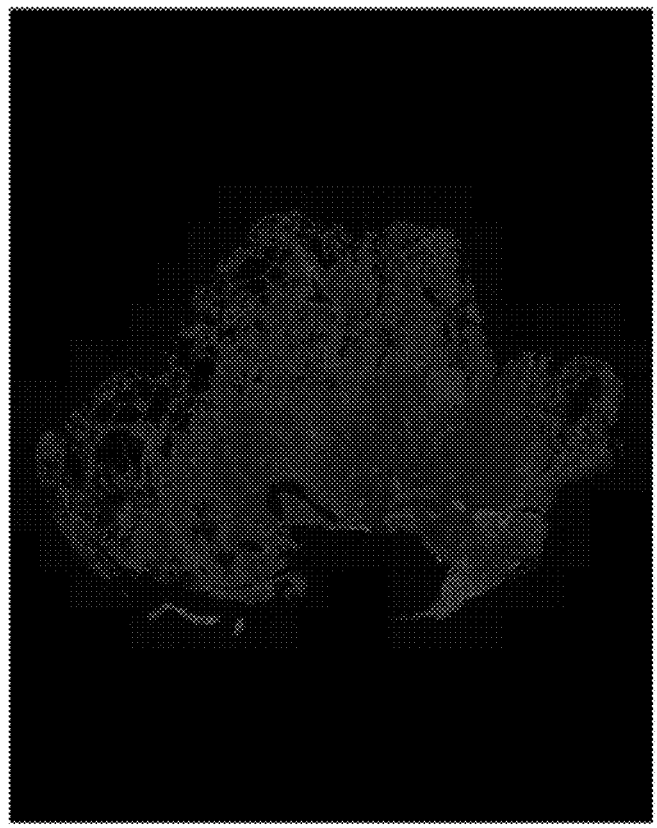
Figure 9D:
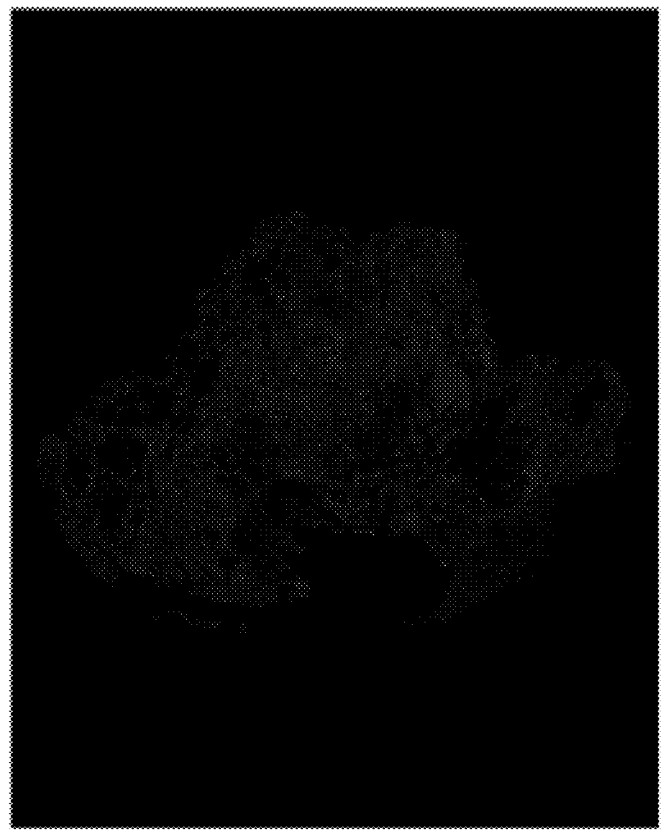
Figure 9C:
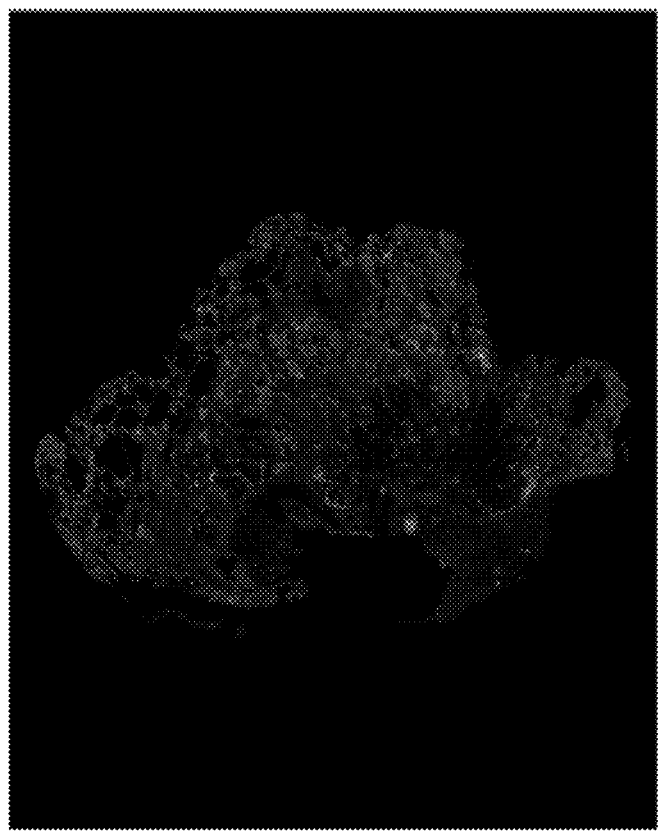
Figure 9F:
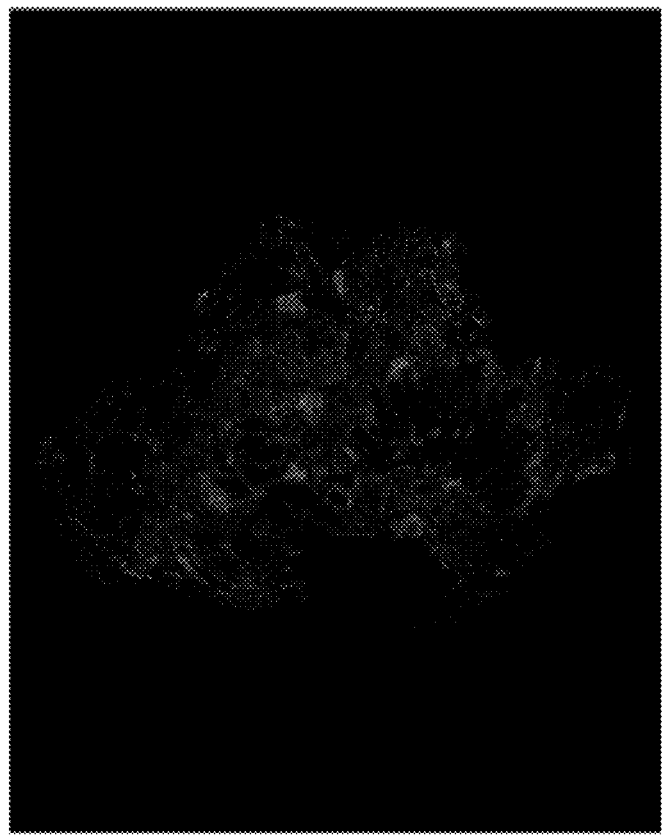
Figure 9E:
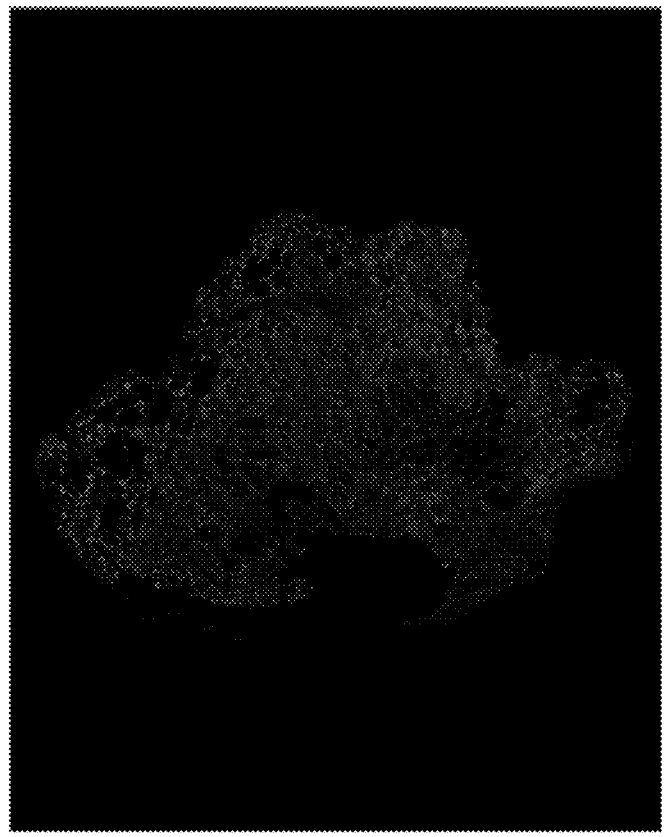
Figure 9H:
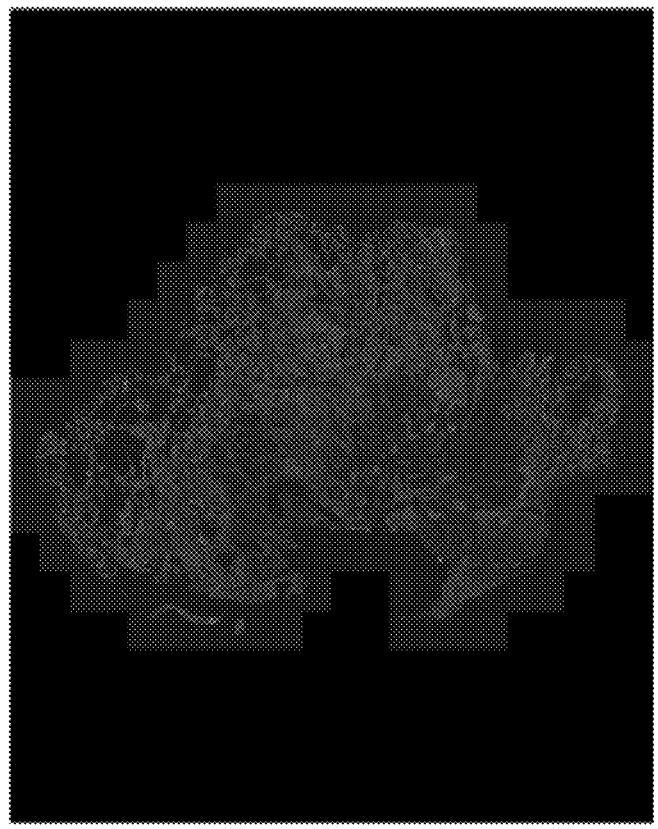
Figure 9G:
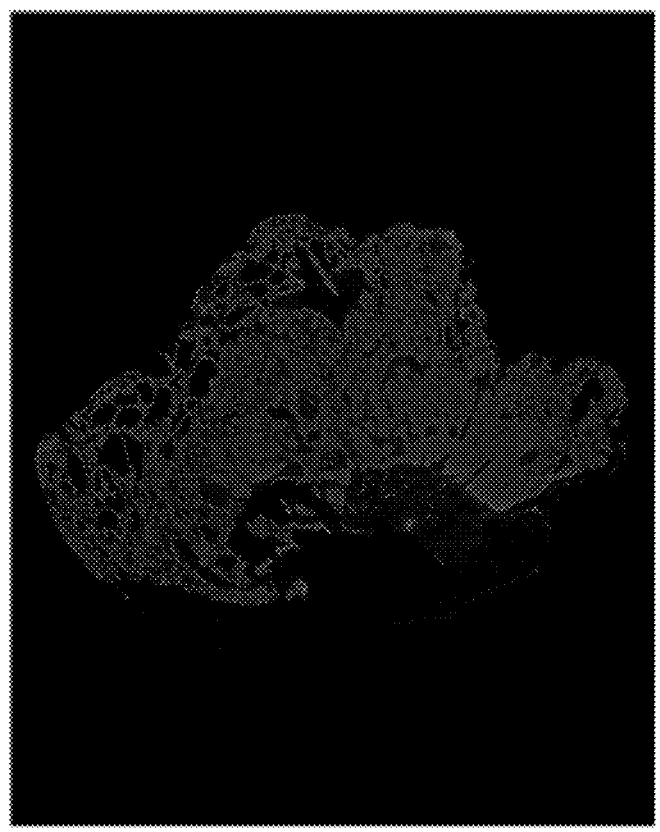

FIG. 8H is the unmixed abundance image for autofluorescence. The image looks broadly similar to FIG. 7H, which is not surprising since the X spectral band was designed to respond only weakly to signals other than endogenous autofluorescence. Both images show features corresponding to collagen structures, generalized extracellular matrix, stroma structures including cell nuclei, and red blood cells.

However, there are important differences. The raw spectral image shown in FIG. 7H includes some signal associated with the Opal620-labeled CD68 targets, and Opal690-labeled PD1 targets, which are largely or entirely absent in the unmixed autofluorescence abundance image of FIG. 8H. This can be understood in terms of the dye spectra described above. The X band shows 1.4% response for Opal620 dye, and 1.0% response for Opal690 dye, compared with the time-normalized response in the band where each dye responds most strongly.

Thus, the raw spectral image in FIG. 7H includes some signal that is associated with the Opal620 component, and some that is associated with the Opal690 component. Spectral unmixing produces the autofluorescence image in FIG. 8H that more correctly reveals the true endogenous autofluorescence signal. In this particular example, the amount of difference is relatively modest.

In some embodiments, the autofluorescence image can be analyzed to identify particular tissue structures, cells, or regions that are either ignored or treated specially in downstream image analysis. In the discussion of FIG. 8D above, in regions associated with red blood cells, the raw spectral image of FIG. 7D showed signal that did not properly belong to that dye component. Without wishing to be bound by theory, a possible explanation is that the autofluorescence for red blood cells differs from that of the average sample structure. It is valuable to recognize that these are red blood cells rather than Treg cells, despite some signal being present in the FoxP3 abundance image. Accordingly, in some embodiments, red blood cells can be identified based on the autofluorescence image, and marked as red blood cells for downstream analysis, ensuring they will not be mistaken for FoxP3-positive nuclei.

This step can be used in other analytical procedures as well. For example, in certain embodiments, the exact consequence of red blood cell fluorescent emissions could be different from the consequences here, although it still may be beneficial to recognize and segregate red blood cells. In some embodiments, structures associated with collagen may confound or degrade a particular measurement, and regions of the sample associated with collage structures can be identified from the autofluorescence image and eliminated from the analytical procedure, or otherwise analyzed according to different criteria or algorithms.

It should be appreciated that various methods are available to decompose the sample images. In particular, the spectral unmixing calculation can be performed in a variety of ways, including by changing the order in which certain steps are performed, and omitting certain steps entirely. As an example, it is not necessary to unmix all members of the abundance matrix to make use of any one unmixed component. Specific rows of the unmixing matrix can be selectively used for the unmixing procedure depending upon which pure spectral contributors are being elucidated.

Further, because the methods and systems described herein directly obtain a background image of the sample (which corresponds approximately—or even almost identically—to a sample autofluorescence image), the sample autofluorescence image can be obtained (e.g., from the background image) prior to unmixing the sample images to obtain the pure spectral contributor images. This two-step analysis procedure can be particularly useful when performing adaptive spectral unmixing that depends on the nature of the autofluorescence spectrum at specific sample locations, and/or when pixels corresponding to certain sample structures (such as red blood cells and/or collagen) are identified from the autofluorescence image and marked, e.g., to exclude those pixels from further analysis.

To obtain the autofluorescence image ahead of the pure spectral contributor images, the autofluorescence abundance can simply be unmixed first in a two-step unmixing procedure. Contributions from non-endogenous spectral contributors (e.g., the applied dyes) are then unmixed based on the sample images corresponding to the raw spectral bands (e.g., bands B1-B7 in this example) and the autofluorescence abundance $A_x$, rather than using the background image corresponding to band X. The unmixing matrix coefficients are revised to take account of the use of $A_x$, as follows:

$$A_x = S^+_x * M \quad [3]$$

Here $S^+_x$ refers to row x of the inverted spectral matrix $S^+$. The other rows of the unmixing matrix can also be revised to take account of the contributions introduced via $A_x$, and the result can be a more diagonal matrix. Because the matrix is more diagonal, it may be possible to omit small-valued terms, speeding up the calculation, without a large impact on accuracy.

(2) Cell Counting

To investigate cell counting based on the sample autofluorescence image, two serial sections of a lung cancer sample were prepared. One section was an unstained negative control prepared without any dye deposition. The other section was stained with a multiplex panel using reagents listed in Table 6, followed by a final incubation with Opal Polaris 780 Anti-Dig (Akoya Biosciences, Waltham, Mass.) at 1:25 dilution for 1 hour at room temperature. All other incubation times were the same as those from the prior example. Sample images were obtained using the same system described in the prior example.

Figure 10A:
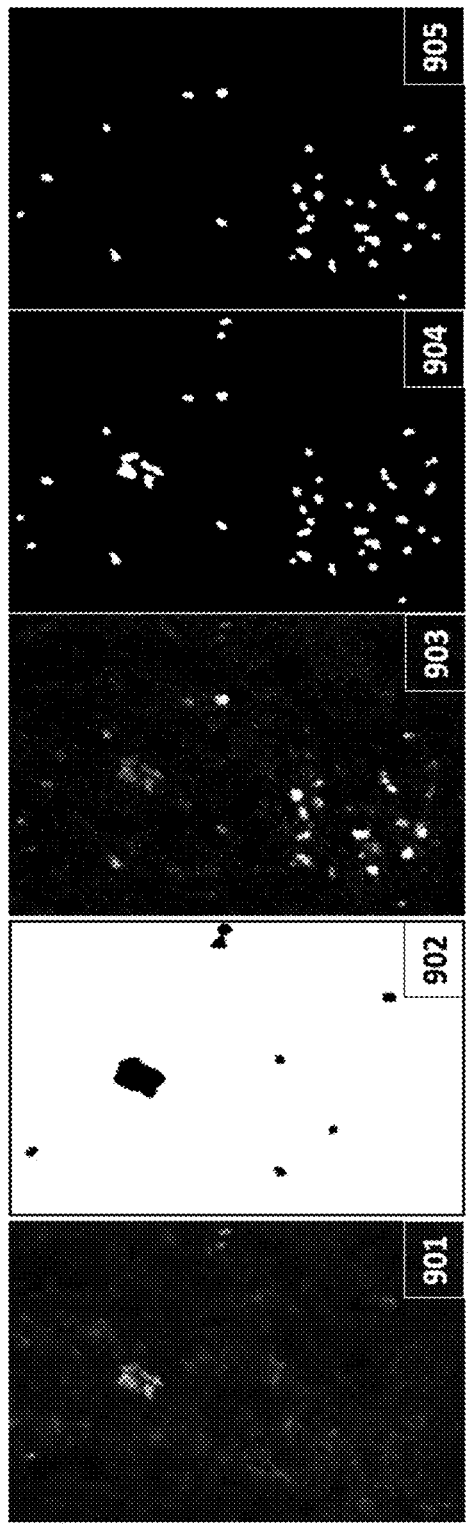
FIGS. 10A and 10B are sets of images, each set including an autofluorescence image, a binary classification mask, a FoxP3 abundance image, a threshold segmentation mask, and an image showing only FoxP3-positive cells, for a sample prepared with multiple non-endogenous dyes and for an unstained sample, respectively.
Figure 10B:
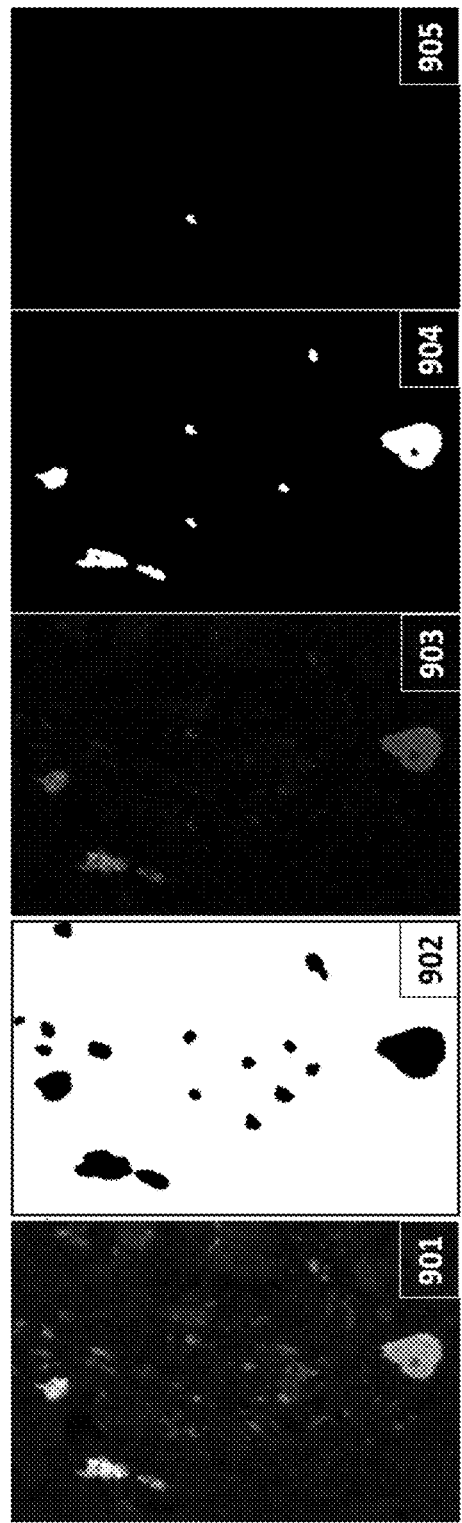

Following measurement of the background image (which was assumed to correspond to the sample autofluorescence image), a pixel-based classification algorithm was trained to identify red blood cells using the automated tissue segmentation tool in inForm® software (Akoya Biosciences, Menlo Park, Calif.). Only the autofluorescence image was used as an input into the classifier. FIG. 10A shows a set of images derived from the sample prepared with the dyes shown in Table 6, while FIG. 10B shows a set of images derived from the negative control sample (with no dyes). Images 901 in FIGS. 10A and 10B show the respective autofluorescence images of the samples.

To train the machine learning algorithm, regions were manually drawn on the negative control autofluorescence image to identify pixels that were either positive or negative for red blood cells. Results from the trained algorithm for both sections are binary classification masks corresponding to images 902 in FIGS. 10A and 10B.

Separately, a cell segmentation algorithm was developed to identify FoxP3-positive cells using the adaptive cell segmentation tool in the inForm® software. Only the unmixed Opal 570/FoxP3 abundance image (images 903 in FIGS. 10A and 10B) was used as an input to this segmentation algorithm. Thresholds for segmentation were set to identify objects in the image that have Opal 570 signal and the elliptical shape of a cell nucleus (images 904 in FIGS. 10A and 10B). All cells identified in the negative control sample (image 904 in FIG. 10B) were false positive detections of autofluorescent species such as red blood cells that have similar morphology to cell nuclei.

Finally, the masks from both algorithms (images 902 and 904 in FIGS. 10A and 10B) were combined to retain only the FoxP3-positive cells that do not overlap with any pixels that were identified to be red blood cells in panels. The resulting masks (images 905 in FIGS. 10A and 10B) show a reduction in the number of false positives relative to images 904.

What is claimed is:

1. A method, comprising:
exposing a plurality of non-endogenous spectral contributors in a biological sample to illumination light and measuring light emission from the sample to obtain N sample images, wherein each sample image corresponds to a different combination of a wavelength band of the illumination light and one or more wavelength bands of the light emission, wherein multiple wavelength bands of the light emission from the plurality of non-endogenous spectral contributors define a wavelength range, and wherein N>1; and

TABLE 6

| Staining Order | Target | Primary Antibody Vendor, Catalog #, Clone, Species | Primary Antibody Dilution Factor | Tyramide Reagent | Tyramide Dilution Factor |
|---|---|---|---|---|---|
| 1 | PD-L1 | CST (Danvers MA), 13684, E1L3N, a-Rb | 1:300 | Opal 520 (Akoya Biosciences, Menlo Park, CA) | 1:150 |
| 2 | FoxP3 | Abcam (Cambridge, UK), ab20034, 236A/E7, a-Ms | 1:100 | Opal 570 (Akoya Biosciences, Menlo Park, CA) | 1:300 |
| 3 | PD-1 | AbCam (Cambridge, UK), ab137132, EPR4877(2), a-Rb | 1:300 | Opal 690 (Akoya Biosciences, Menlo Park, CA) | 1:100 |
| 4 | CD68 | Dako (Santa Clara CA), M0876, PG-M1, a-Ms | 1:100 | Opal 620 (Akoya Biosciences, Menlo Park, CA) | 1:150 |
| 5 | CD8 | AbD Serotec (Oxford UK), MCA1817, 4B11, a-Ms | 1:300 | Opal Polaris 480 (Akoya Biosciences, Menlo Park, CA) | 1:150 |
| 6 | Pan-Cytokeratin | Novus (Littleton CO), NBP2-29429, AE1/AE2, a-Ms | 1:200 | Opal TSA-Dig (Akoya Biosciences, Menlo Park, CA) | 1:100 | exposing the sample to illumination light in a background excitation band and measuring light emission from the sample in a background spectral band to obtain a background image of the sample, wherein the background spectral band comprises a distribution of wavelengths having a full width at half maximum (FWHM) spectral width $\Delta\lambda$ and a center wavelength $\lambda_c$ within the wavelength range, and wherein the wavelengths within the background spectral band correspond to wavelengths within a range from $\lambda_c - \Delta\lambda/2$ to $\lambda_c + \Delta\lambda/2$, wherein for each of the plurality of non-endogenous spectral contributors in the sample exposed to the illumination light in the background excitation band, a spectral emission intensity at each wavelength within the background spectral band is 10% or less of a maximum measured spectral emission intensity of the non-endogenous spectral contributor following excitation of the non-endogenous spectral contributor in each of the wavelength bands of the illumination light and the background excitation band.

2. The method of claim 1, further comprising obtaining an autofluorescence image of the sample from the background image.

3. The method of claim 2, further comprising displaying the autofluorescence image on a display device.

4. The method of claim 2, further comprising determining, at each of multiple locations in the sample, an amount of autofluorescence emission from the sample.

5. The method of claim 4, further comprising, at each of the multiple locations in the sample, and for one or more of the N sample images:

adjusting values corresponding to sample emission intensity to correct for autofluorescence emission from the sample based on the amount of autofluorescence emission at each of the multiple locations and at least one pure spectrum of autofluorescence emission from the sample.

6. The method of claim 5, wherein the at least one pure spectrum of autofluorescence emission comprises multiple pure spectra of autofluorescence emission, and wherein the multiple pure spectra of autofluorescence emission each correspond to a different subset of the multiple locations.

7. The method of claim 6, further comprising:

decomposing at least some of the N sample images based on the amount of autofluorescence emission from the sample at each of the multiple locations to obtain M spectral contributor images, wherein each of the M spectral contributor images corresponds to light emission only from a different one of the non-endogenous spectral contributors; and at each of the multiple locations, determining an amount of the M non-endogenous spectral contributors in the sample.

8. The method of claim 7, further comprising decomposing the at least some of the N sample images based on at least one pure spectrum of autofluorescence emission from the sample.

9. The method of claim 8, wherein the at least one pure spectrum of autofluorescence emission comprises multiple pure spectra of autofluorescence emission, and wherein the multiple pure spectra of autofluorescence emission each correspond to a different subset of the multiple locations.

10. The method of claim 2, further comprising classifying pixels of one or more of the sample images into different classes based on information derived from the autofluorescence image.

11. The method of claim 10, wherein the different classes correspond to different cell types in the sample.

12. The method of claim 1, wherein for each of the plurality of non-endogenous spectral contributors in the sample exposed to the illumination light in the background excitation band, the spectral emission intensity at each wavelength within the background spectral band is 4% or less of the maximum measured spectral emission intensity of the non-endogenous spectral contributor following excitation of the sample in each of the wavelength bands of the illumination light and the background excitation band.

13. The method of claim 1, wherein for each of the plurality of non-endogenous spectral contributors in the sample exposed to the illumination light in the background excitation band, the spectral emission intensity at each wavelength within the background spectral band is 2% or less of the maximum measured spectral emission intensity of the non-endogenous spectral contributor following excitation of the sample in each of the wavelength bands of the illumination light and the background excitation band.

14. The method of claim 1, wherein N>3.

15. The method of claim 1, wherein N>5.

16. The method of claim 1, wherein the sample comprises M non-endogenous spectral contributors, and wherein M≤N.

17. The method of claim 16, wherein M>4.

18. The method of claim 17, wherein a sum of spectral emission intensities of each non-endogenous spectral contributor in the sample at each wavelength within the background spectral band is 10% or less of a total fluorescence emission intensity in the background spectral band.

19. The method of claim 16, wherein M>6.

20. The method of claim 16, wherein the M non-endogenous spectral contributors comprise one or more fluorescent species that selectively bind to different chemical moieties in the sample.

21. The method of claim 20, wherein the one or more fluorescent species comprise one or more immunofluorescent probes.

22. The method of claim 20, wherein the M non-endogenous spectral contributors comprise one or more counterstains.

* * * * *